March 2, 1954
T. B. JOCHEM
2,671,194
POWER-DRIVEN IMPEDANCE CONTROLLER FOR
MULTIPLE INDUCTION MOTOR DRIVES
Filed Oct. 18, 1951
7 Sheets-Sheet 1
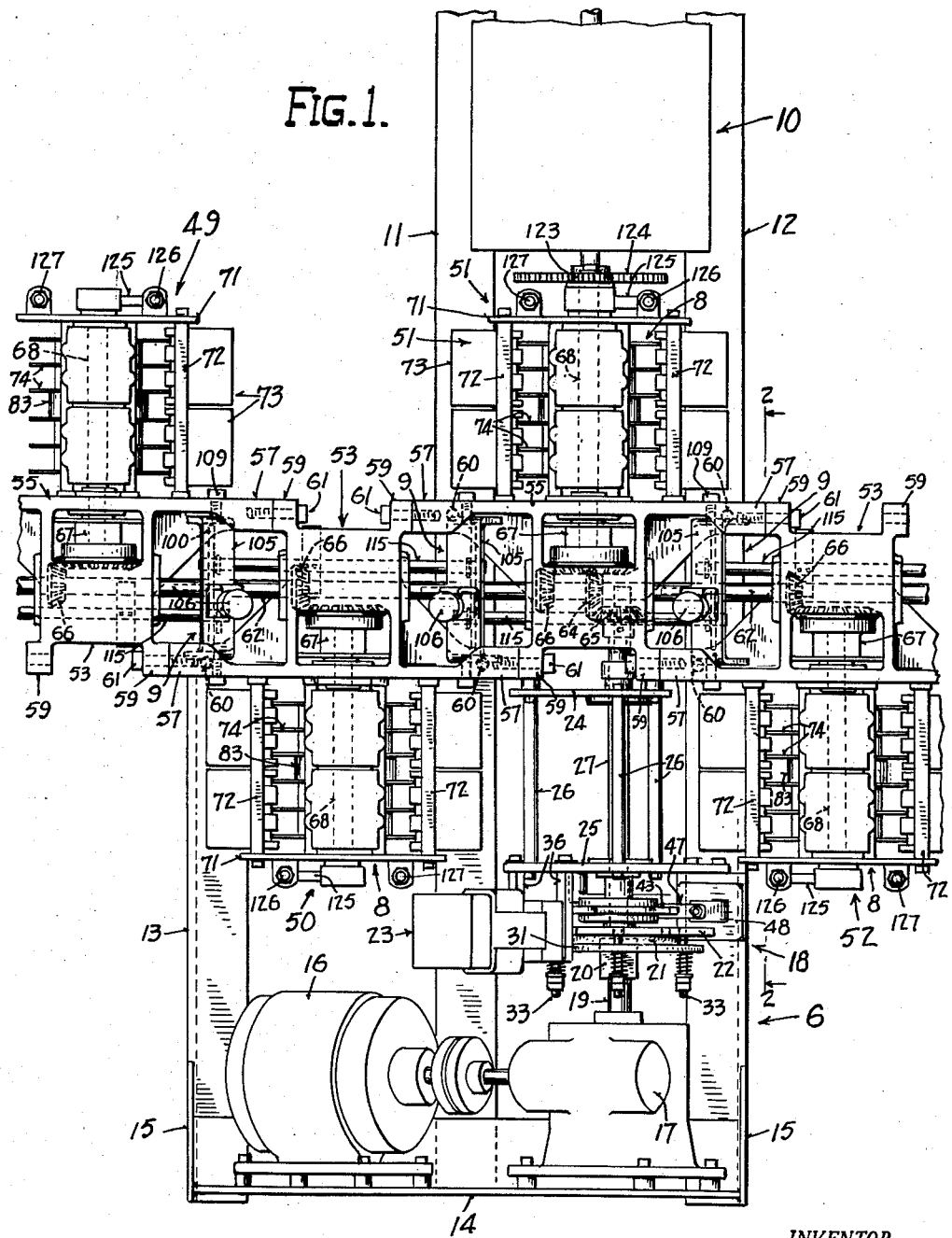
FIG.1.
INVENTOR.
Theodore B. Jochem
BY
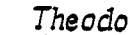
ATTORNEY.

March 2, 1954     T. B. JOCHEM     2,671,194
POWER-DRIVEN IMPEDANCE CONTROLLER FOR
MULTIPLE INDUCTION MOTOR DRIVES
Filed Oct. 18, 1951     7 Sheets-Sheet 2

INVENTOR.
Theodore B. Jochem
BY
ATTORNEY.

March 2, 1954
T. B. JOCHEM
2,671,194
POWER-DRIVEN IMPEDANCE CONTROLLER FOR
MULTIPLE INDUCTION MOTOR DRIVES
Filed Oct. 18, 1951
7 Sheets-Sheet 3
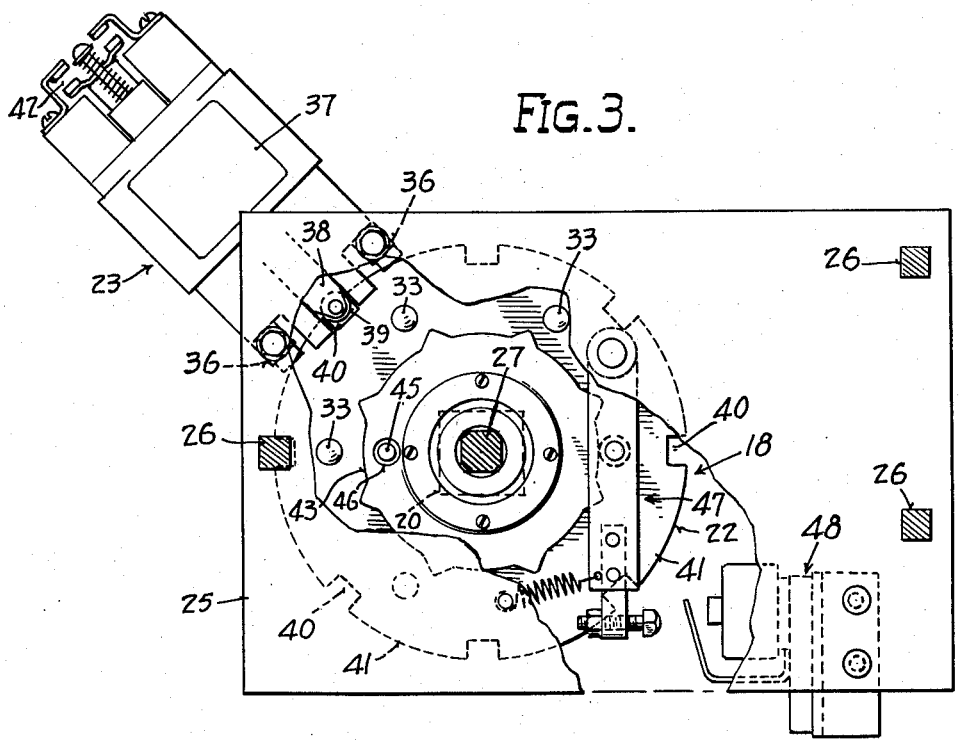
FIG. 3.
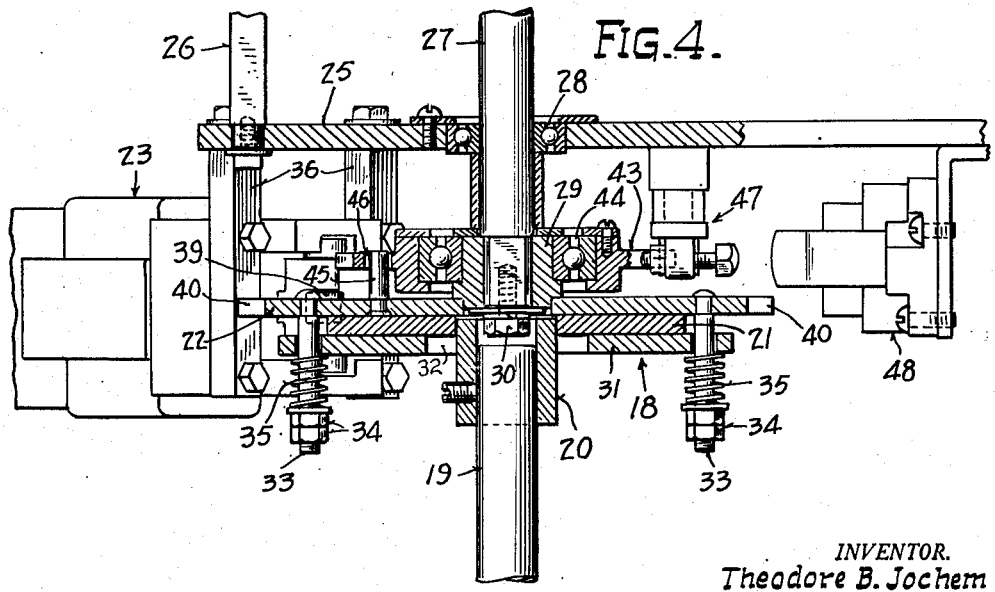
FIG. 4.
INVENTOR.
Theodore B. Jochem
BY
ATTORNEY.

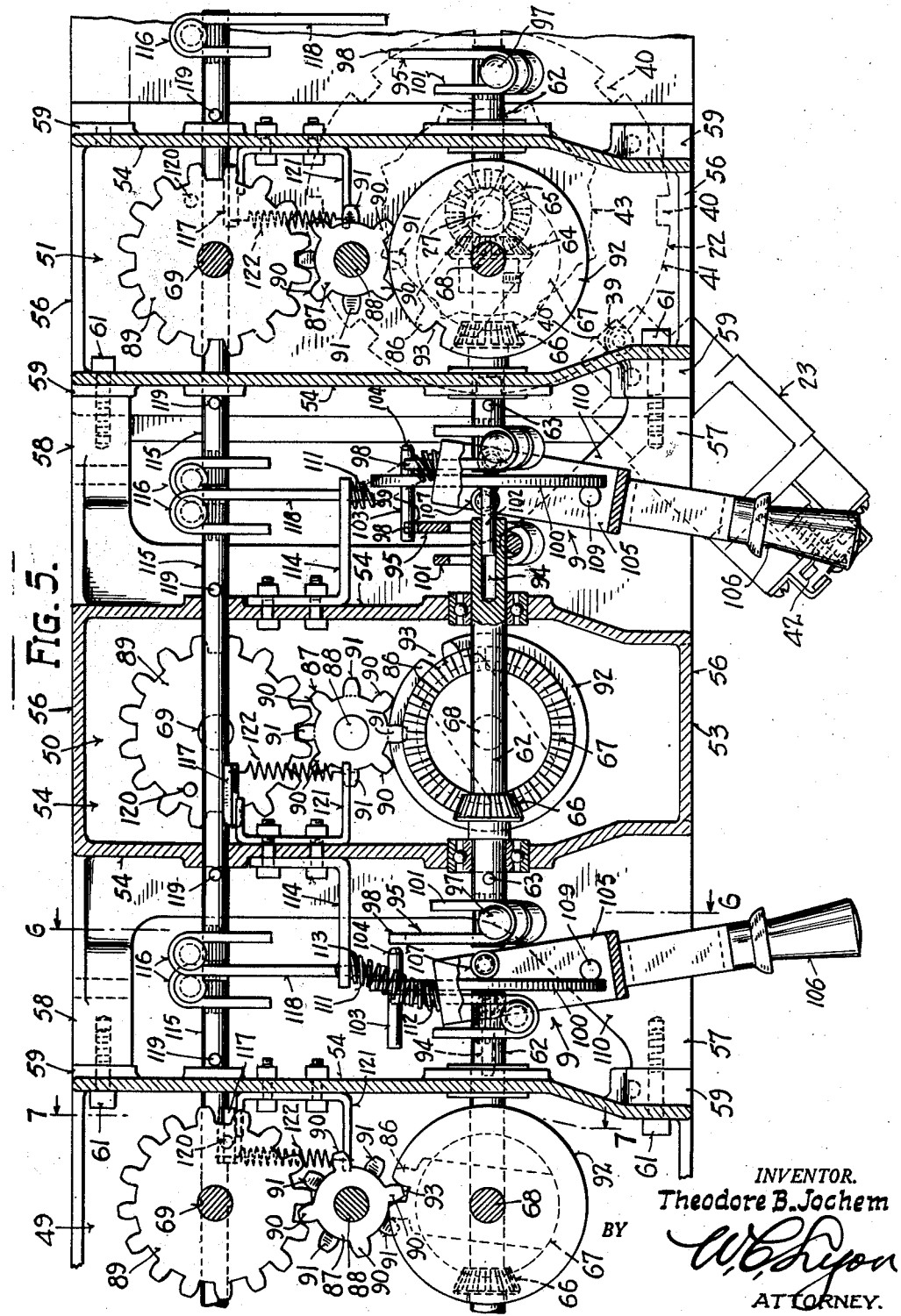

March 2, 1954
T. B. JOCHEM
2,671,194
POWER-DRIVEN IMPEDANCE CONTROLLER FOR
MULTIPLE INDUCTION MOTOR DRIVES
Filed Oct. 18, 1951
7 Sheets-Sheet 5
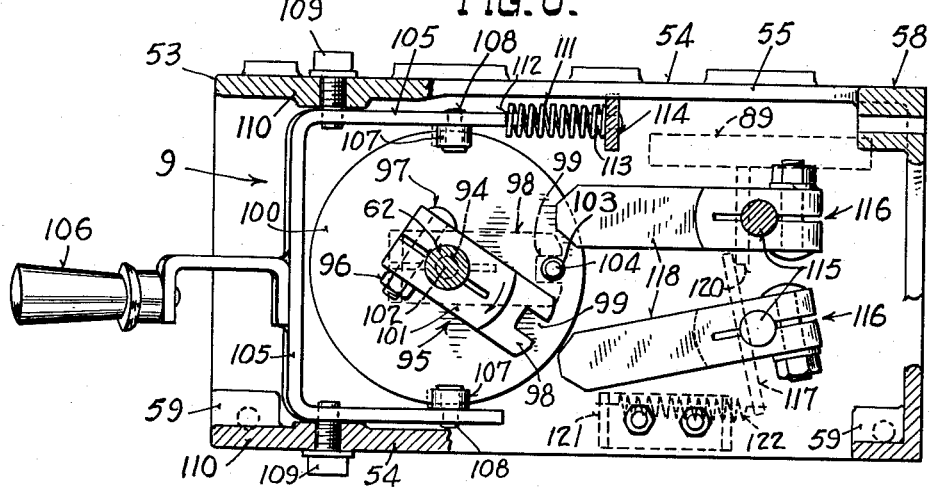
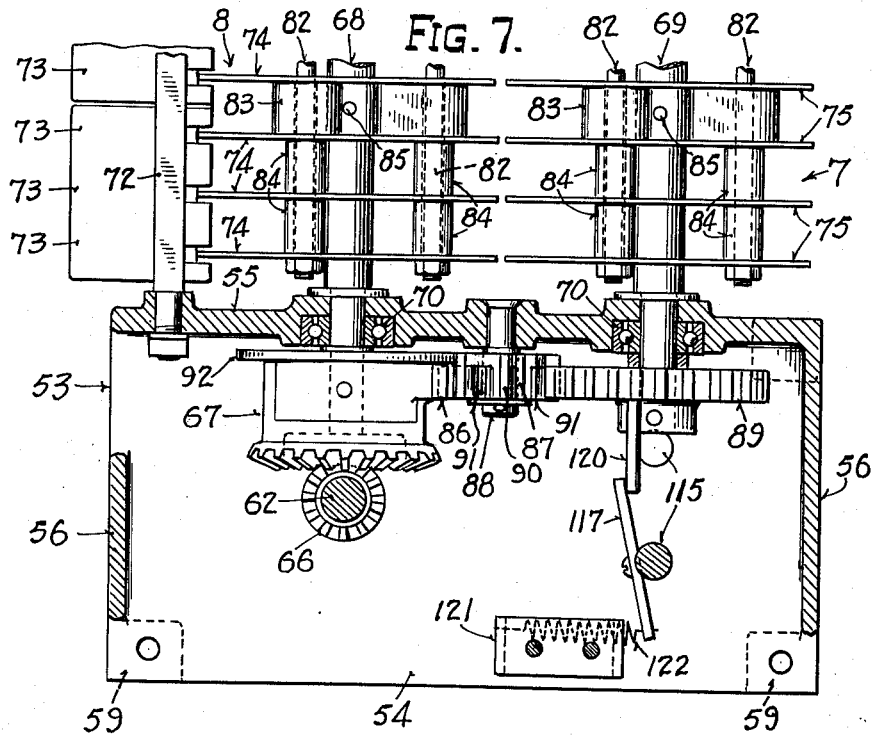
INVENTOR.
Theodore B. Jochem
BY
A. E. Lyon
ATTORNEY March 2, 1954
T. B. JOCHEM
2,671,194
POWER-DRIVEN IMPEDANCE CONTROLLER FOR
MULTIPLE INDUCTION MOTOR DRIVES
Filed Oct. 18, 1951
7 Sheets-Sheet 6
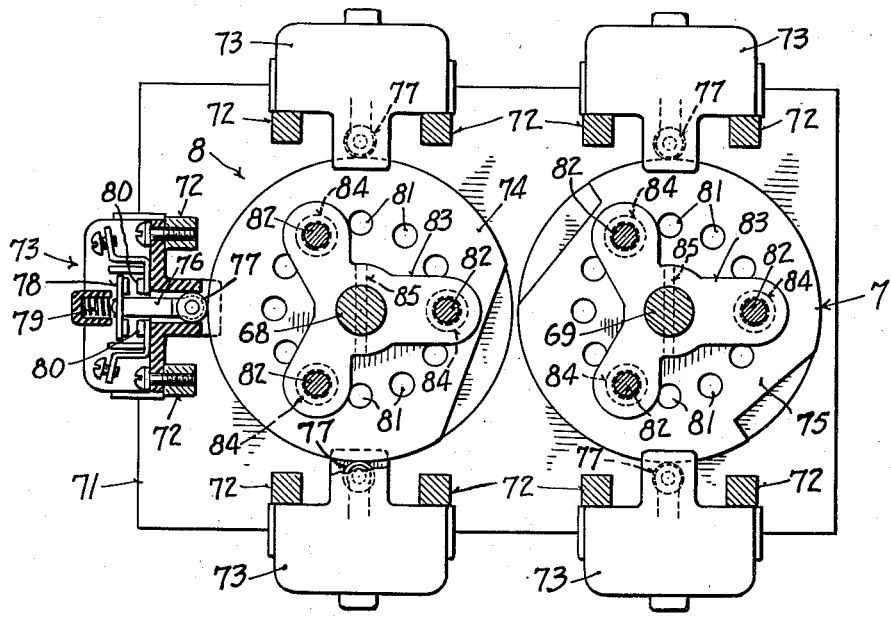
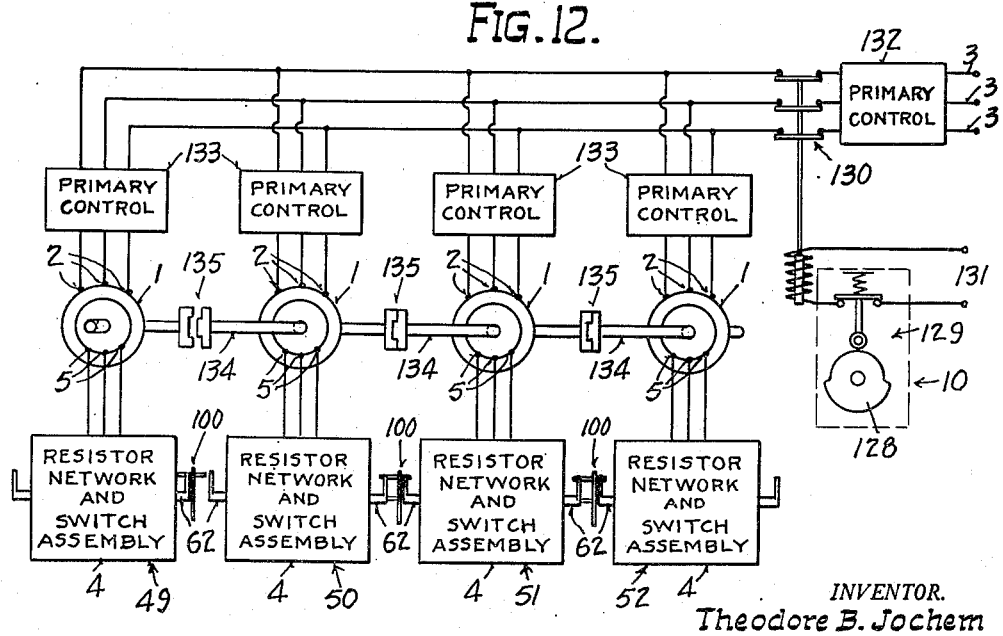
INVENTOR.
Theodore B. Jochem
BY
ATTORNEY March 2, 1954
T. B. JOCHEM
2,671,194
POWER-DRIVEN IMPEDANCE CONTROLLER FOR MULTIPLE INDUCTION MOTOR DRIVES
Filed Oct. 18, 1951
7 Sheets-Sheet 7
FIG.11.
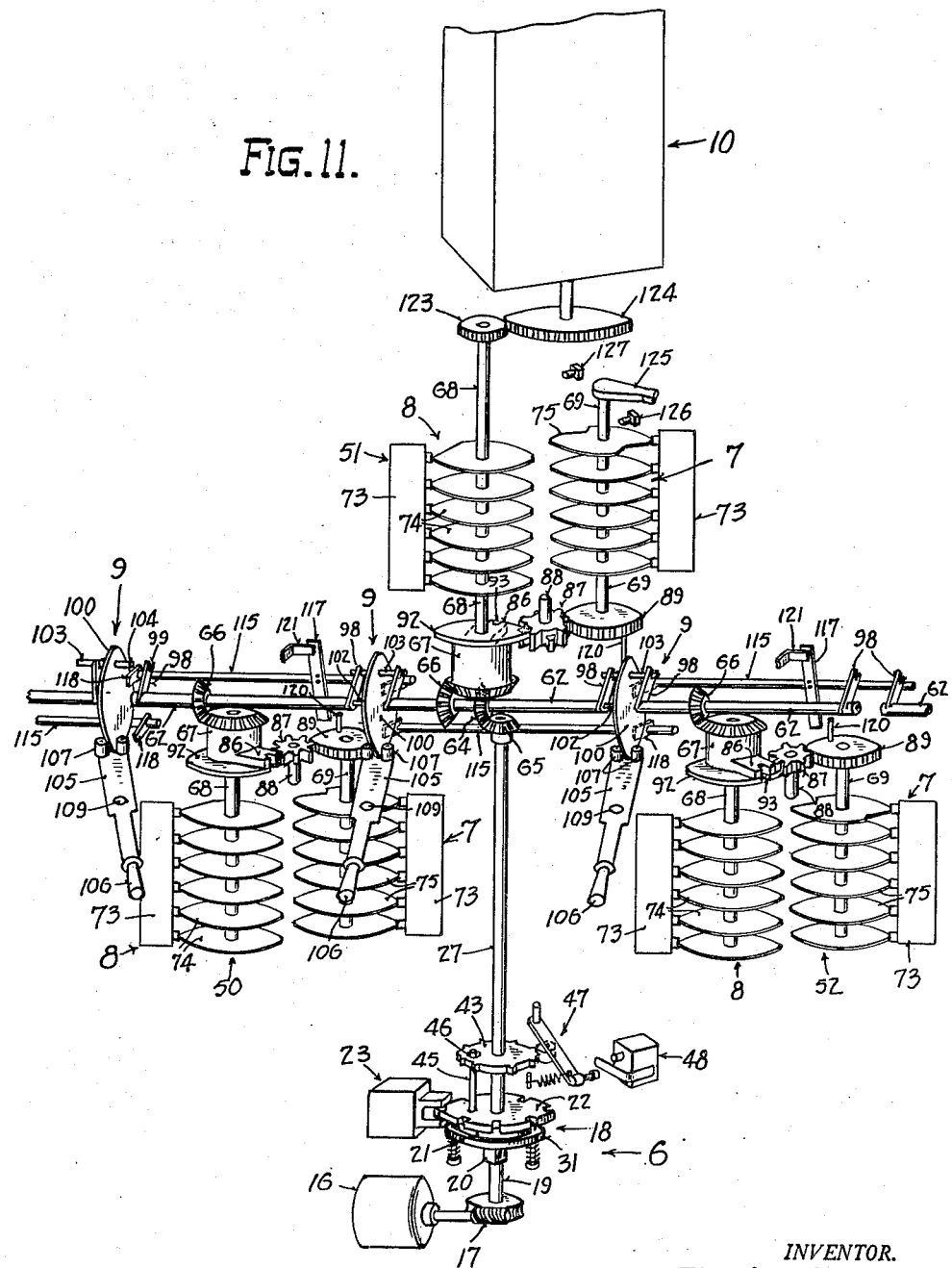
INVENTOR.
Theodore B. Jochem
BY
ATTORNEY.

Patented Mar. 2, 1954

2,671,194

UNITED STATES PATENT OFFICE 2,671,194

POWER-DRIVEN IMPEDANCE CONTROLLER FOR MULTIPLE INDUCTION MOTOR DRIVES

Theodore B. Jochem, Wauwatosa, Wis., assignor to Cutler-Hammer, Inc., Milwaukee, Wis., a corporation of Delaware Application October 18, 1951, Serial No. 251,860

33 Claims. (Cl. 318—338)

This invention relates to electrical controllers, and particularly to motor driven controllers for the drive motors of large printing presses and the like.

In printing an edition of a newspaper having a relatively large circulation, a number of individual press units are employed together with a unit adapted to cut and fold the various printed strips into completed newspapers. The number of press units functioning during a given run is governed by the number of pages in the newspaper, but at least one folder unit must be operating at all times during the run in order to prevent glutting of the strips as they emanate from the presses.

Under what is known as the unit drive system a plurality of electric drive motors are utilized, one for the folder and one for each of the press units. Each motor is coupled not only to its associated press or folder but to a common press shaft which serves to maintain the necessary synchronism between the cooperating units.

According to usual practice the drive motors are of the polyphase wound rotor induction variety, and it is necessary to the desired operation of the press and folder units that the motors be operable at a large number of speed points between 25 and 100 per cent of rated speed. Such speed regulation is normally obtained by connecting resistors in circuit with the motor secondaries and commutating the resistors into and out of the secondary circuits in a predetermined manner. The speed of the motors will then be highest when the resistance in circuit therewith is at a minimum and lowest when the resistance is maximum.

The principal object of the present invention is to provide a controller for motors functioning under the unit drive system, which controller operates to insure an equal division of load between the various drive motors in spite of either the electrical misalignment thereof or the mistaken attempts to couple and uncouple individual controller units at improper times.

Another object is to provide a controller the various units of which may be manually coupled and uncoupled in accordance with the size of the newspaper being printed, but which are locked against coupling and uncoupling at all times except when the controller is in its zero position and the drive motors are not operating.

Another object of the invention is to provide a controller which is readily adaptable for use with a variety of sizes of press systems ranging from two units to many units.

Another object of the invention is to provide means to de-energize the drive motors during locking and unlocking of the various couplings between controller units, so that any resistance commutation occurring during such locking and unlocking is rendered harmless to govern the drive motors in undesired ways.

Another object is to provide a controller which is compact and easily accessible for wiring and for replacement of parts.

A further object is to provide a controller having a maximum number of like parts, so that the manufacture of the controller is relatively economical and the assembly thereof is simplified.

The controller, in general, comprises a plurality of controlling units each including main and vernier switch drums, with the drums being electrically connected, respectively, to individual resistor networks in order to commutate resistance into and out of the secondary circuits of corresponding wound rotor induction motors and thereby regulate the speed thereof. The drums of each unit are alternately mounted on reversed similar castings and are driven through individual couplings by an electric motor operating through a special clutch arrangement. In order to insure that the respective drive motors always bear equal shares of the load, means are provided to lock the couplings against shifting movement at all times except when the switch drums are in predetermined correspondings positions and the motors are de-energized.

Other objects and advantages of the invention will be set forth more fully in the following description of an embodiment of the invention illustrated in the accompanying drawings, wherein:

Figure 1 is a front elevational view showing the controller in assembly;

Fig. 3 is a plan view of the special slip clutch mechanism, as viewed from the right side of the controller in Fig. 1;

Fig. 4 is a sectional view of the slip clutch mechanism taken primarily axially of the shafts in Fig. 3;

Fig. 5 is a partial horizontal section taken longitudinally of the controller units and illustrating the coupling and locking mechanisms therefor;

Fig. 6 is a vertical sectional view taken on line 6—6 of Fig. 5;

Fig. 7 is a vertical sectional view taken on line 7—7 of Fig. 5 and illustrating portions of the switching drums in side elevation;

Fig. 8 is a horizontal section of the switching drums, taken on line 8—8 of Fig. 2;

Fig. 11 is a schematic view illustrating the various driving, coupling and locking portions of the controller; and Fig. 12 is a schematic wiring diagram showing the relation between the controlling units and the press and folder motors governed thereby.

Figure 2:
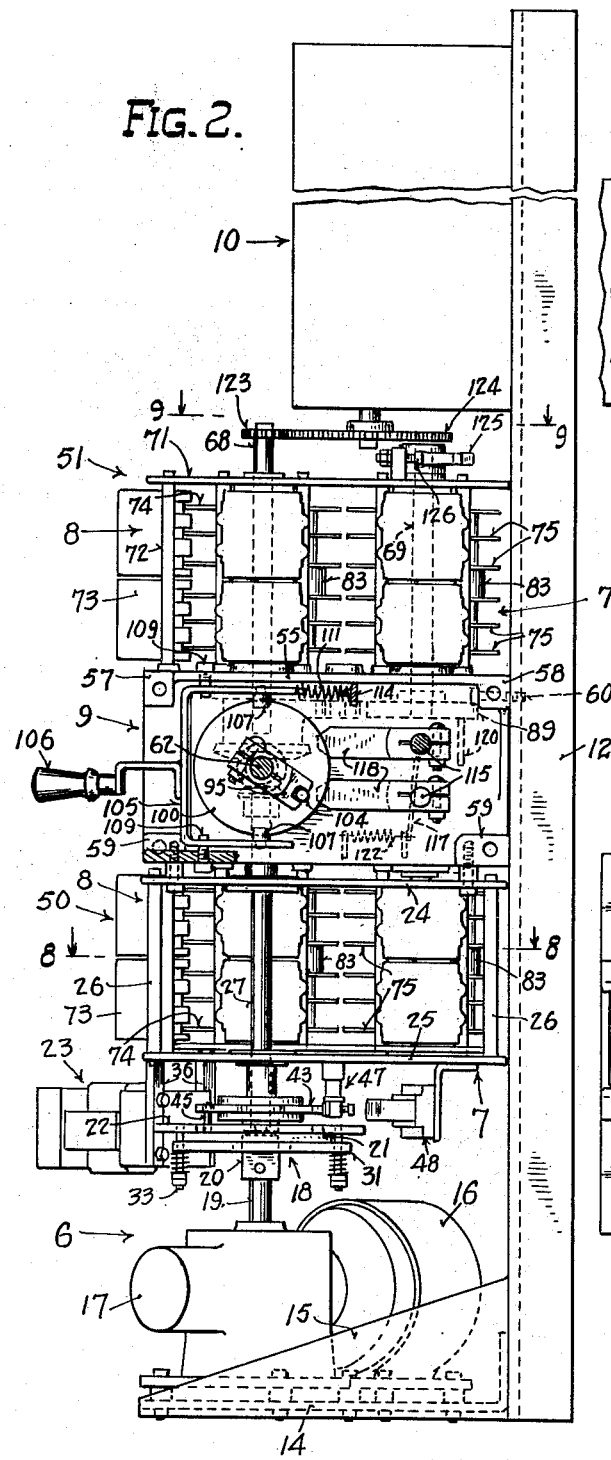
Fig. 2 is a corresponding assembly view and taken generally on line 2—2 of Fig. 1.

The present application is intended to be read in conjunction with my application Serial No. 171,854, for a Multi-Position Motor Driven Controller, filed July 3, 1950, and assigned to the assignee hereof. In the application referred to, there is illustrated a controller for a single motored printing press system as distinguished from the present unit drive system wherein a plurality of corresponding electric motors are utilized as previously set forth.

Because of the great number of resistors which would be required if each increment of change in the speed of a wound rotor induction motor were achieved through the connection or disconnection of a single corresponding resistor from the resistance network in circuit with the motor secondary, the referred to invention provides a network comprising a large number of vernier resistors and a small number of main resistors. With such an arrangement the desired step-by-step decrease in the total network resistance, and corresponding increase in the motor speed, is attained by first sequentially subtracting all of the vernier resistors from the network and then substantially simultaneously adding the vernier resistors and commutating one or more main resistors in such a way that the total network resistance is decreased to the value for the next higher speed point. The vernier resistors are then sequentially re-substracted, after which they are added simultaneously with the commutation of more main resistors to achieve the next speed point. This process, which is described and illustrated in detail in the cited application, is repeated until top speed is attained and produces speed control with a greatly reduced number of resistor taps and attendant circuit wiring.

In order to commutate the main and vernier resistors of the referred to controller for the single motored press system, the switches adapted to commutate the vernier resistors are all mounted on a vernier switch drum and the switches for the main resistors are likewise mounted on a main switch drum. Through the operation of a hunting tooth intermittent drive between the vernier drum and the main drum, the main drum is caused to rotate a partial revolution once during each complete revolution of the vernier drum. Thus the vernier drum commutates its entire associated resistance during a complete revolution and then causes the main drum to commutate a portion of its associated resistance, after which the vernier resistance is recommutated and the process repeated in the manner set forth above.

Referring to Fig. 12 of the drawings, the present unit drive controller is illustrated in conjunction with a representative press system which comprises four identical three-phase induction motors 1 having their primary terminals 2 connected across the various phases of corresponding power lines 3, there being suitable primary control equipment interposed as will be partially described subsequently. In order to eliminate the necessity of mechanically aligning the wound rotors of the drive motors 1, a separate switching assembly and resistor network, represented at 4 in the drawings, is connected to the secondary terminals 5 leading to each rotor.

As in the case of the controller described in the copending application previously referred to, each resistor network of the present controller comprises main and vernier resistors and each switching assembly consists of main and vernier switch drums. The resistor networks and switching assemblies for the various drive motor units are preferably identical to each other, and the operation thereof in commutating resistance is substantially the same as was described in detail in the cited application.

The present arrangement thus comprises a plurality of corresponding portions each consisting of a drive motor for one of the presses or folders of a printing press system, a resistor network of main and vernier resistors, and main and vernier switch drums to commutate the resistors into and out of the motor secondary circuit and thus achieve a wide range of speed control. As previously stated, the rotors of all of the motors 1 are synchronized by coupling the same to a single press shaft. The motors must therefore be regulated in such a manner that they tend to rotate at the same speed, or else the motors tending to operate at the higher speeds will bear an undue share of the press load and will drive the remaining motors as generators.

To prevent this unbalance in motor loading, the movements of the individual switch drum assemblies are synchronized with the movements of corresponding drum assemblies so that the same resistance values are simultaneously commutated by each assembly. The resistance in circuit with each motor secondary is thus always the same, and the motors tend to run at identical speed for balanced distribution of load. This step-by-step commutation by the respective units is accomplished, according to the present invention, in spite of any attempts to throw the various controlling units out of synchronism through the mistaken coupling or uncoupling thereof at improper times.

As shown generally in Figs. 1 and 11 of the drawings, the mechanical portions of the unit drive controller comprise a driving and special clutching arrangement 6, a plurality of driven switch assemblies each consisting of a main drum 7 and vernier drum 8, and a number of mechanical coupling and locking assemblies 9 designed to permit manual coupling or uncoupling of the switch assemblies at the correct times. In addition, an electrical interlock drum 10 above one of the switch assemblies is adapted with suitable limit switches to start and stop the controller and the motors 1 as well as to regulate various equipment auxiliary to the printing press system.

In order to provide a mounting for the above listed mechanical elements, three vertical angle bars 11, 12 and 13 are secured in laterally spaced relation on a suitable backing means such as a wall of a control cabinet, not shown. Two adjacent bars, numbered 11 and 12, are made relatively long in order to support the electrical interlock drum 10. The third and shorter bar 13 is arranged on one side of bars 11 and 12 and serves together therewith to support a forwardly extending horizontal shelf 14, the latter being secured to the lower ends of the angle bars and braced by triangular side plates 15.

The shelf 14 is designed to partially support the driving and clutching means 6 which consists of a drive motor 16 for the controller, a gear reducer 17, and a special slip clutch mechanism 18. The gear reducer 17 and clutch mechanism 18 are arranged in substantial vertical alignment with the electrical interlock drum 10, whereas the motor 16 is disposed adjacent the shorter vertical angle bar 13.

It is one of the features of the controller that the various switching assemblies which commutate resistance into and out of the secondary circuits of corresponding printing press drive motors may be mounted on either or both sides of the clutching mechanism 18 and associated parts, depending upon the particular requirements of the system which it is desired to control. For example, in the controller illustrated the various controlling units comprising drum assemblies 7 and 8 are mounted on both the right and left sides of clutch 18, with the vertical bar 13 and motor 16 being shown as on the left side of the clutch. When the requirements of the system make it desirable to mount the controlling units to the right of clutch 18 and not to the left thereof, the bar 13, motor 16 and cooperating elements are reversed so that the controller may be mounted within a rectangular cabinet of minimum size.

The controller drive motor 16, which is bolted to the shelf 14, is in one form of the split field reversible type adapted to be energized by single phase alternating current. Preferably, the speed of the motor 16 in the forward direction is less than the speed thereof in reverse direction. This is because the resistance in the secondary circuits of the press drive motors 1 is decreased by the switch drums 7 and 8 when the motor 16 is running forwardly and increased during reverse motor operation, and the secondary resistance may safely be increased more rapidly than it is decreased.

The gear reducer 17, which is also bolted to shelf 14 and is driven by motor 16 through a horizontal shaft and suitable coupling, may be of any preferred variety designed to produce the desired speed in its vertically disposed output shaft 19.

As best shown in Fig. 4, the upper end of shaft 19 has non-rotatably mounted thereon a coupling member 20 having a square outer portion which fits into a complementally formed square central opening in a friction disc 21. Accordingly, the friction disc 21 rotates at all times when the motor 16 and gear reducer 17 are operating. This constant rotation of the friction disc 21 is operative, as will subsequently be described, to drive the controller through an indexing wheel 22 except during intervals when the wheel is prevented from rotating as by a position lock assembly 23.

The indexing wheel 22, position lock 23, and other remaining portions of the slip clutch mechanism 18 are supported by a frame (Figs. 1–4) which includes a pair of vertically spaced horizontal plates 24 and 25, the upper plate 24 being suitably bolted to the main frame portions of the controller and the lower plate 25 being suspended from the upper plate by a plurality of posts 26. In addition to providing support for the major portions of the clutch mechanism 18, the described frame serves as a mounting means for a vertical drive shaft 27 which is freely rotatable in ball bearings 28 in the respective plates 24 and 25.

Referring again to Fig. 4, the lower end of the drive shaft 27 is made square for non-rotatable fitting into a correspondingly shaped aperture in the hub 29 for the indexing wheel 22. Thus when the indexing wheel is rotated by the disc 21, the hub 29, which is rigidly secured to the indexing wheel as by brazing, operates to drive the shaft 27 and other parts of the controller. In order to secure the indexing wheel and hub at the desired elevation, a bolt 30 is threaded upwardly into the lower end of shaft 27 and provided with a washer which bears upwardly on the hub 29.

As a means to bias the friction disc 21 upwardly against the indexing wheel 22 and thus effect driving of the latter, a clutch disc 31 is arranged beneath the friction disc and formed with a large central clearance opening 32 for free vertical and rotational movement independently of the coupling member 20. The clutch disc 31 is also provided with a plurality of circularly spaced clearance openings to receive corresponding cylindrical pins 33 mounted on indexing wheel 22. The pins 33, which are located outwardly of the rotating friction disc 21 to prevent interference therewith, have nuts 34 threaded on the lower ends thereof and adapted to serve as seats for compression springs 35 which bias the clutch and friction discs upwardly towards the indexing wheel.

With the described arrangement, rotation of the indexing wheel 22, shaft 27, and driven elements is effected at all times during operation of the motor 16 and friction disc 21, unless such rotation is prevented by the position lock assembly 23 or a stop associated with any driven element. When the drive is thus interrupted, the friction disc 21 merely slides relative to the clutch disc 31 and indexing wheel 22.

Referring particularly to Fig. 3 the position lock assembly 23, which serves as one method of preventing rotation of the indexing wheel 22 and drive shaft 27 and thus interrupting the controller drive, is mounted by means of posts 36 beneath an outer corner of the lower frame plate 25. The assembly 23 comprises an operating winding 37, a plunger assembly 38 operated thereby, and a roller 39 mounted at one end of the plunger assembly for insertion into one of eight circumferentially spaced rectangular slots 40 in the periphery of the indexing wheel. Suitable means, not shown, are provided to bias the roller 39 into a slot 40, so that it is necessary for the winding 37 to be energized in order to retract the roller 39 from the slot and thus permit the indexing wheel 22 to be driven by the constantly rotating friction disc 21.

The location of the slots 40 on the indexing wheel 22 is correlated with the construction of the main and vernier switch drums 7 and 8, to which the shaft 27 is drivingly connected as will be described, in such a way that the switches of the drums are either fully open or fully closed when a slot 40 is in registry with the roller 39. When, on the other hand, the location of the indexing wheel is such that a tooth 41 between two slots 40 is in registry with the roller 39, at least some of the switches of the drums 7 and 8 are in the process of either opening or closing. The registering of the roller 39 and a slot 40 thus means that the switch drums are fully in a predetermined switching position effecting operation of the governed motors 1 at a particular speed point. In order to effect operation of the motors at the next higher or lower speed point, the position lock winding 37 is energized to retract the roller 39 and permit the controller drive to be resumed in the desired direction until the roller is caused to ride into an adjacent slot.

Because of the fact that the drum switches are fully open or closed only when the roller 39 is adjacent or in a slot 40, it is necessary to the prevention of arcing in the drum switch contacts that the controller motor 16 be maintained in running condition at all times when the roller is adjacent the teeth 41 between the slots 40. To insure such continued motor energization, suitable contacts 42, which form part of the control circuit for the controller motor, are incorporated in the position lock assembly 23 for operation by the plunger 38 thereof. The contacts 42 are closed when the plunger 38 and roller 39 are retracted, and effect completion of an energizing circuit for the controller motor until the roller 39 rides into a slot 40.

For proper operation of the position lock assembly 23, without possibility of the binding of the roller 39 at one outer corner of a slot 40 and the consequent holding of contacts 42 in a half-open position, it is necessary that the roller 39 ride along a tooth 41 and into a slot 40, as distinguished from dropping into a slot 40 through deenergization of winding 37 at the instant the roller is opposite the slot. Accordingly, means are provided to insure the continued energization of winding 37 until the associated roller 39 is opposite approximately the center of a tooth 41.

These means include a ratchet wheel 43 which is mounted on a ball bearing assembly 44 on the hub 29 for the indexing wheel 22, there being a driving connection between the indexing and ratchet wheels in the form of a pin 45 riveted on the indexing wheel and inserted in an enlarged opening 46 in the ratchet wheel. The ratchet wheel, when rotated via the pin 45 by the indexing wheel, operates to rock a suitable lever assembly 47 and thus intermittently mechanically actuate a special current relay 48. Both the lever assembly and the current relay are mounted on the underside of the lower horizontal plate 25, and the relay is connected together with the position lock winding 37 into the control circuit for the controller motor 16.

The operation of the ratchet wheel 43, lever assembly 47, and current relay 48 is such that after de-energizing of the position lock winding 37 has been initiated by the operator of the controller, the winding 37 is nevertheless maintained energized until the roller 39 is opposite approximately the center of a tooth 41. When the center of a tooth is reached, the lever assembly 47 is rocked to actuate the relay 48 and thus effect de-energization of the winding 37, so that the roller 39 operated thereby rides into the next adjacent slot 40. The drive for the ratchet wheel 43, which comprises the pin 45 inserted in the enlarged opening 46 as previously described, incorporates a predetermined lost motion action which effects dropping of the roller 39 on the center of a tooth 41 in spite of electrical and mechanical lags in the controller as the same is operated in forward and reverse directions.

The construction and operation of the slip clutch mechanism 18, position lock assembly 23, relay 48 and associated parts is substantially the same as was described and illustrated in detail in the copending application previously referred to. Reference is made to said application for the details of structure and operation of these elements, as well as of the control circuit for the controller drive motor 16.

Referring now to Figs. 1 and 11 wherein the controller is illustrated in assembly, the previously described motor and clutching means operate through the vertical shaft 27 to drive a plurality of similar controlling units numbered 49 through 52, starting from the left in Fig. 1. Each controlling unit comprises a frame 53 on which the main and vernier switching drums 7 and 8 are mounted, as well as shaft and gear means adapted to transmit the driving force from the vertical drive shaft 27 to the drums. For compactness of structure and to facilitate wiring of the switches of the drums 7 and 8, the controller units are arranged alternately in upright and inverted positions. Thus the unit 51 above the vertical shaft 27 is illustrated in upright position, with the switch drums 7 and 8 thereof being spaced a considerable distance from the drums of the next upright unit 49 for unrestricted wiring and adjustment operations.

Figure 10:
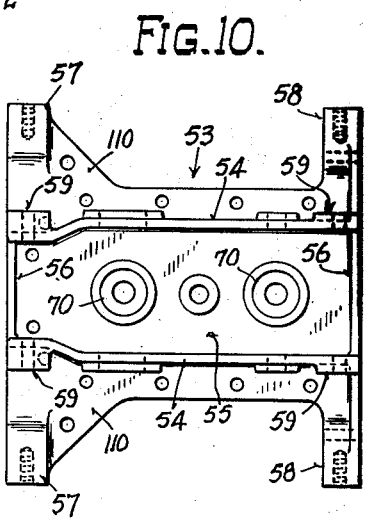
Fig. 10 is a plan view illustrating one of the frames for the controller in inverted position.

As best illustrated in Fig. 10, the frame 53 of each unit 49—52 comprises a generally rectangular body portion and front and rear leg portions projecting outwardly laterally from the body portion. The body portion of each frame is formed with two vertically disposed parallel side walls 54, an overhanging horizontal wall 55 adapted to provide a mounting surface for the drums 7 and 8, and with front and rear walls 56 extending perpendicularly of the side walls 54 to brace the same. For ease of adjustment and inspection of the gear elements mounted within the body portion, the side opposite the horizontal wall 55 is illustrated as being open as is a portion of the front wall 56 adjacent horizontal wall 55.

The front leg portions 57 of each frame member 53 project in opposite directions from the front corners of the overhanging horizontal wall 55, and the braced rear leg portions 58 similarly project from the rear horizontal wall corners. Since, as shown in Fig. 1, the frame members are alternately arranged in upright and inverted positions, the legs of adjacent frames overlap each other and may be connected at their ends to suitable boss portions 59 at the corners of side walls 54 opposite walls 55.

In assembling the complete controller, a previously assembled controller unit 51 may first be mounted in upright position, for example by bolts 60 (Figs. 1 and 2) projecting through the rear frame legs 58 and into the vertical angle bars 11 and 12. An adjacent previously assembled controller unit 50 is then mounted in inverted position by means of bolts 61 (Figs. 1 and 5) threaded through bosses 59 and into the ends of the corresponding front and rear frame legs 57 and 58. The rear legs 58 of the frame for controller unit 50 are also connected by the bolts 60 to angle bars 11 and 13, so that a rigid mounting on all angle bars is obtained. The remaining controller units 49 and 52 are then similarly assembled by means of leg bolts 61, with the use of other mounting means such as bolts 60 being optional.

The described rigid and lightweight frame construction and arrangement may be continued indefinitely in accordance with the number of controller units needed for the particular printing press system to be controlled. It is a feature of the invention that the frame members 53 may be identical, regardless of the side of the driving elements on which they are mounted, in order to promote economy of mass production.

In continuing the drive for the switch drums 7 and 8 of the controlling units 49—52, four horizontal drive shafts 62 are suitably journalled, respectively, in the side walls 54 of the frame members 53. Due to the vertical centering of the shaft bearings in the side walls as shown in Figs. 6 and 7, the shafts 62 for both upright and inverted units are axially aligned with each other.

In addition to being axially aligned the respective horizontal shafts 62 are locked, as by shoulders and by pins 63 (Fig. 5), in axial positions causing the proximate ends of adjacent shafts to be spaced from each other and located between the body portions of adjacent frame members. With such an arrangement, the coupled or uncoupled condition of the shafts may easily be controlled by the coupling and locking assemblies 9 to be described subsequently.

As best shown in Figs. 1, 5 and 11, the drive shaft 62 for controller unit 51 has mounted thereon a bevel gear 64 which is drivingly engaged by a corresponding bevel gear 65 at the upper end of vertical drive shaft 27. The shaft 27, which is held at the proper elevation by suitable spacers and collars and extends into the open end of the frame body portion of unit 51, serves to effect rotation of the gear 64 and closely relates parts at all times when motor 16 is running and the drive is not interrupted as by the position lock 23. Since the unit 51 may not be uncoupled independently of the other units, it is normally employed to govern the operation of the newspaper folder unit which must always be operating during a given press run.

In order to transmit the rotative movements of the shaft 62 for the folder controlling unit 51 to the drums 7 and 8 thereof, a bevel gear 66 is formed integral with shaft 62 a short distance from the mounted gear 64. The gear 66 meshes with the bevel teeth of a relatively large special gear 67, the latter being formed hollow at its lower central portion to provide space for gear 64.

The special gear 67 is suitably mounted at the lower end of a vertically extending shaft 68 for the vernier switch drum 8, so that upon rotation of drive shaft 62 of the controlling unit 51 the vernier shaft 68 is rotated at a relatively slow speed. This speed differential, resulting from the large size of special gear 67 relative to gear 64, is advantageous in that it greatly reduces the lead or lag of switch operation between various units due to possible lost motion in the gearing and coupling between units.

Referring to Figs. 7 and 10, the vernier shaft 68 and the shaft 69 for the main switch drum 7 are mounted in laterally spaced parallel relation by means of suitable bearings 70 located, respectively, in the forward and rear portions of the horizontal frame wall 55. In order to provide mountings for the upper ends of vernier and main shafts 68 and 69, a bearing plate 71 (Figs. 1 and 2) is spaced above wall 55 and in parallel relation thereto. The plate 71, which is supported by ten rectangular posts 72 bolted thereto and to the edge portions of frame wall 55, is provided with suitable bearings for shafts 68 and 69 positioned correspondingly to the bearings 70.

In addition to their function as supporting members for the bearing plate 71 of folder controlling unit 51, the rectangular posts 72 serve as mountings for the switches 73 of the main and vernier switch drums 7 and 8. For this purpose, the posts are arranged in pairs, as shown in Fig. 8, with two pairs supporting each side of plate 71 and one pair supporting the front thereof. Although the switches 73 are vertically arranged six to each pair of posts 72, there are only two switch casings per pair of posts since three of the switches 73 are assembled in each casing.

The casings for the switches 73 are bolted to the outer surfaces of the forward three pairs of posts 72 in such a way that the switches are engaged, respectively, by six vertically spaced horizontal cams 74 on the vernier shaft 68, whereas the switches on the rear two pairs of posts are similarly mounted for actuation by six correspondingly arranged cams 75 on main shaft 69. Since each main cam thus engages two switches 73, and each vernier cam three switches, there are twelve switches operated by the main cams and eighteen by the vernier.

Referring to Fig. 8, each switch 73 comprises a plunger 76 having a roller 77 mounted at the inner end thereof and a bridging contactor bar 78 at the outer end thereof, the latter being biased by a spring 79 toward a pair of stationary contacts 80. In operation, when the roller 77 is riding on a high portion of a main or vernier cam the plunger 76 serves to hold the contactor 78 away from contacts 80 against the bias of spring 79. As soon as a depression on the actuating cam is reached, the holding effect of the plunger is terminated and the contactor allowed to engage the contacts and thus close the switch. The switches 73 are substantially the same as were described, in connection with the interlock drum, in the application previously referred to and further description herein is believed to be unnecessary.

In order to achieve the desired switching sequence adapted to effect operation of the governed motors 1 at predetermined speed points, the vernier and main cams 74 and 75 are staggered along the respective shafts 68 and 69 therefor. Such staggering is preferably achieved by providing a plurality of circularly spaced holes 81 in each cam, with the spacing between the holes 81 corresponding to the angle to cam rotation necessary to effect a change from one speed point to the next.

The holes 81 are utilized, as shown in Figs. 7 and 8, to lock the respective cams in the correct circumferentially offset positions by selectively inserting bolts 82 therethrough and through holes in spiders 83 which are adapted to be located centrally of the shafts 68 and 69. To insure that the cams are also maintained in the correct vertical positions along shafts 68 and 69, suitable spacers 84 are provided around the bolts 82 between adjacent cams.

Once the cams have been arranged in the correct staggered relation as described, the proper positioning of the various main and vernier cams may easily be achieved by locking the drive for the drums 7 and 8 in a given controlling position, that is to say with the roller 39 of position lock 23 in a slot 40 of indexing wheel 22. Thereafter, the entire set of cams 74 and 75 for each cam shaft 68 and 69 is rotated on its shaft until the proper switches 73 are either fully open or fully closed as desired. The respective spiders 83 are then locked in position, for example by pins 85, and the correct adjustment thereby attained.

In order to insure against undesired current inrushes into the governed motors 1, the spiders 83 are relatively arranged so that there is a slight offset between the vernier cams 74 and main cams 75. This offset causes a vernier switch 73 to open before the corresponding main switch closes at a changeover point between switching positions when the drums 7 and 8 are rotating in a direction to decrease the total resistance in the secondaries of motors 1.

As previously described generally herein and as described in detail in the referred to copending application, the cams 75 of main switch drum 7 rotate only intermittently relative to the rotation of vernier cams 74. This, as previously stated, is to cause the main drum 7 to commutate only a part of its associated resistance each time the vernier drum has commutated its entire associated resistance and thus effect motor speed regulation with a minimum of switches and resistors. In order to effect such relative movements, intermittent type drive gearing is provided in the body portion of frame member 53 of controlling unit 51 at the lower ends of shafts 68 and 69 for the vernier and main cams.

Referring to Figs. 5, 7 and 11, the intermittent drive gearing includes a two-toothed gear sector 86 formed integral with the upper part of special gear 67, a special idler gear 87 journalled on a downwardly projecting stud 88 which is riveted in frame wall 55 between the bearings 70 for the main and vernier shafts, and a spur gear 89 mounted at the lower end of main shaft 69 in meshing relation with idler 87. The idler gear 87 is constructed with each alternate tooth 90 extending vertically for the full thickness of the gear, and each remaining alternate tooth 91 extending for only the lower portion thereof.

Both the half teeth 91 and the lower portions of the full teeth 90 are positioned to be actuated by the two-toothed gear sector 86 when the latter is rotated into engagement therewith once during each revolution of the vernier shaft 68 on which the special gear 67 is mounted. The upper portions of the full teeth 90, on the other hand, perform no drive function but instead cooperate with a disc 92 to lock the idler and main gears 87 and 89 against rotation except during actuation thereof by the gear sector 86. The disc 92, which is riveted to the upper surface of special gear 67, has a notch 93 therein registering with the space between the two teeth of sector 86 and serving to discontinue the locking action during engagement of the two teeth with idler teeth 90 and 91.

Because of the arrangement of the various gearing 67, 86, 87 and 89 in substantially the same plane, and also because of the arrangement of the main and vernier drums 7 and 8 laterally adjacent each other, the switching assemblies are extremely compact and efficient in comparison to former structures. This is particularly important where, as in the present instance, a number of controlling units are employed as distinguished from merely one unit.

Although the preceding descriptive matter has had special reference to the upright controlling unit 51 for the folder drive motor it is, with a few exceptions, equally applicable to the units 49, 50, and 52 adapted to control the motors 1 for the presses themselves. One exception is that the units other than unit 51 need contain no gear 64 since the drives therefor are normally through the horizontal drive shaft 62 of unit 51. Another exception pertains to the units 50 and 52, wherein substantially everything described in connection with unit 51 may be regarded as inverted in Fig. 1 through clockwise or counterclockwise rotation of unit 51.

Even in the case of the units 50 and 52, however, the horizontal drive shafts 62 are not inverted. Accordingly, because of the altered positions of gears 66 relative to the other gearing, the drums 7 and 8 of the inverted units are rotated in reverse directions relative to the directions of rotation of the drums of upright units 49 and 51. This reverse drive is advantageous in that both upright and inverted drums may be constructed and adjusted identically in order to effect identical switching actions upon rotation of all drive shafts 62 in the same direction.

As previously indicated, it is a practical necessity that the drums 7 and 8 of the various units 49—52 be synchronously driven to corresponding controlling positions, so that all of the governed drive motors 1 tend to run at the same speed at the same time. This is because of the unbalanced load bearing relation which would occur in the interconnected motors 1 if unit 49, for example, were in a position tending to effect rotation of the motor 1 governed thereby at a speed higher than the speeds tending to be assumed by the remaining motors.

To prevent this unbalanced operating condition, the motors 1 and the resistor networks are preferably identically constructed and the drum assemblies of the respective controlling units are likewise identically constructed and adjusted. In addition, due to the previously mentioned reverse drives for the inverted units, all of the drum assemblies are synchronously driven to corresponding positions upon synchronous rotation of the horizontal drive shafts 62 in the same direction. This is only true, however, if the drums are initially in corresponding positions as distinguished from the unrelated positions which would occur, for example, if the drive for unit 49 were started after the same had been allowed to lag behind the other controlling units.

According to the invention, the coupling and locking assemblies 9 (Figs. 1 and 5) are adapted to prevent coupling and uncoupling of operative controlling units at all times except when the switching assemblies thereof are in predetermined corresponding positions with the shafts 62 therefor in predetermined rotational positions. As will subsequently be described, the corresponding positions at which coupling and uncoupling of controlling unit shafts 62 is possible preferably occur when the governed motors 1 are in a de-energized condition between press runs.

In order to accommodate the coupling elements of the assemblies 9, both end portions of each horizontal drive shaft 62 are longitudinally serrated, and one end portion of each shaft, for example the right end portion in Fig. 5, is provided with an axial bore 94. Each serrated shaft portion is adapted to be inserted into corresponding apertures in the arms of a generally U-shaped coupling crank 95, with the crank being suitably slotted (Fig. 6) for pinching onto the serrated shaft portion through the tightening of a nut 96 on a bolt 97 which is inserted between the arms of the crank.

The outer arm 98 of each crank 95 extends perpendicularly of shaft 62 for a substantial distance and is provided at its end with a rectangular notch 99 adapted to receive a pin of disc member 100 next to be described. The inner crank arm 101, on the other hand, is relatively short and serves merely to stabilize the crank on the shaft 62 therefor.

As shown in Figs. 5 and 11, a single disc member 100 is mounted transversely between each pair of proximate shaft ends by means of a pin 102 which projects normally from the center of the disc and into the bore 94 in the right end of the associated shaft 62. The bore 94 and pin 102 are sufficiently long to permit a substantial amount of disc movement axially of the shafts.

To effect coupling and uncoupling of two adjacent shafts 62 through right and left axial movement of the associated coupling disc 100, a pin 103 is mounted perpendicularly through each disc a short distance inwardly from the periphery thereof as shown in Fig. 6. On one side of the disc, preferably the side opposite center pin 102, the pin 103 is relatively short and is provided with a beveled end 104 to facilitate insertion into a corresponding notch 99 in coupling arm 98 upon shifting of the disc to the right. The opposite portion of the pin 103 is of sufficient length to remain within its corresponding notch 99, regardless of the axial position of the disc 100, and is accordingly not beveled.

In order to shift the discs 100 axially of shafts 62 and thus control the position of pin ends 104 relative to notches 99, a manually operable lever assembly is provided between the body portions of each pair of adjacent frame members 53. Referring to Figs. 5, 6, and 11, each lever assembly comprises a U-shaped lever member 105 of slightly larger internal dimensions than the diameter of coupling disc 100, a handle 106 suitably mounted on the vertical base of the member 105 at the front of the controller, and two pairs of rollers 107 provided on the horizontal arms of member 105 adjacent the upper and lower edges of the corresponding coupling disc.

The rollers 107 in each pair are journalled on pins 108 which extend inwardly from the horizontal arms of lever member 105 and are laterally spaced to cause the rollers to engage opposite sides of the associated disc 100 outwardly of pin 103. The rollers thus serve to effect axial movement of the disc when the lever member 105 is pivoted on upper and lower fulcrum bolts 109 which are threaded inwardly through horizontal web portions 110 in the frame members 53. As shown in Figs. 5 and 10, the webs 110 extend between the front frame legs 57 and the overhanging horizontal frame walls 55, so that the upper fulcrum bolt 109 for each lever member 105 may be threaded through the web of an upright frame 53 and the lower fulcrum bolt through the web of an inverted frame.

It is important to the proper operation of the coupling and locking means 9 that the U-shaped lever members 105 are always pivoted to either one extreme position or the other, causing the coupling discs 100 and pins 103 to be in fully coupling or uncoupling positions at all times. Accordingly, a compression spring 111 (Figs. 5 and 6) is mounted between a lug 112 at the inner end of the upper horizontal arm of each lever 105 and a corresponding lug 113 on an angle bracket 114. The angle brackets 114 for the various lever assemblies are bolted opposite horizontal frame walls 55 to the central portions of the side walls 54 of the inverted frames 53 for controlling units 50 and 52, and are positioned and shaped so that the lugs 113 thereon are directly to the rear of the fulcrum bolts 109 for the corresponding levers 105. Each lug 113 thus provides a base from which a spring 111 can expand and actuate the corresponding lever to one extreme position or the other after pivoting movement has been initiated by the operator of the device.

In addition to their function of actuating the discs 100 to couple and uncouple adjacent drive shafts 62, the lever members 105 may be employed to actuate suitable set-up switches, not shown, mounted on the frame portions 53 of the controller. The set-up switches are incorporated in the control circuits for the governed drive motors 1 and serve to prevent the improper connection of the motors 1 and the control circuits therefor when the motors are in a de-energized condition between press runs.

Referring to Figs. 5, 6, and 11, the coupling for the left controlling unit 49 is illustrated in uncoupled condition and the remaining couplings, for units 50 and 52, are shown in coupled condition. Since the shaft 62 of uncoupled unit 49 is thus idle, the associated coupling disc 100 and pin 103 are maintained in a given radial position by the outer arm 98 of the crank 95 mounted at the right end of the unit 49 shaft. Accordingly, coupling of the respective shafts 62 for units 49 and 50 is only possible when the notch 99 of the crank 95 at the left end of the shaft for unit 50 registers with the adjacent pin end 104.

Once such registering has been attained, when the shafts 62 are in predetermined rotational positions or radial alignment, the left unit 49 may be coupled by throwing the related lever handle 106 to the left and thus axially shifting the disc 100 to insert the pin end 104 into notch 99 as illustrated in connection with the remaining couplings.

In the operation of the controlling units from positions at which the governed motors 1 are stopped to positions at which the motors run at full speed, the shafts 62 rotate through a substantial number of revolutions, for example twelve revolutions. Coupling of a shaft 62 to the shaft for a previously stationary unit, as described above, would thus be possible twelve times during a complete commutating operation, and it would also be possible to uncouple adjacent shafts at any position. Since, as stated heretofore, this is undesired in that it would permit unbalanced loading in the motors 1, locking elements are incorporated in the assemblies 9 to prevent coupling or uncoupling of the units at all times except when they are all in a single controlling position.

The locking means for each controlling unit (Figs. 5, 6, 7 and 11) include a horizontally disposed locking shaft 115 journalled parallel to drive shaft 62 in both side walls 54 of frame 53, a pair of cranks 116 mounted one at each end of shaft 115, and a lever 117 secured to the mid-portion of the shaft 115 to effect rotation thereof and thus of the cranks 116. The locking shaft 115 of each unit is disposed to the rear of the associated drive shaft 62 and is relatively close to the open end of the frame body portion opposite the horizontal wall 55 thereof on which the switch drums 7 and 8 are mounted.

Due to the described off-center location of each locking shaft 115, the shafts 115 for the upright controlling units 49 and 51 are below the drive shafts 62 thereof, and the shafts for the inverted units 50 and 52 are above their corresponding drive shafts. This staggered locking shaft relation permits the ends of the locking shafts 115 of adjacent controlling units to overlap slightly at a point directly to the rear of the associated coupling disc 100, so that the cranks 116 may serve to lock the discs 100 in either left or right axial positions.

The locking cranks 116 are identical in construction and mounting to the coupling cranks 95, except that the relatively long outer arms 118 of cranks 116 are tapered at their ends instead of being notched as in the case of the coupling crank arms 98. Referring to Figs. 5 and 6, the locking crank arms 118 on each shaft 115 extend forwardly and terminate with their tapered ends on one side of the associated discs 100 for prevention of coupling or uncoupling movement thereof, there being roll pins 119 through locking shafts 115 adjacent the frame walls 54 in order to prevent axial movement of the locking shafts when the discs 100 are attempted to be shifted at improper times.

The levers 117, which serve to rotate the respective locking shafts 115 and locking crank arms 118 between locking and unlocking positions, are secured by suitable screws in corresponding recesses in the shafts 115 and extend upwardly and downwardly therefrom for substantially equal distances. One end of each lever 117 extends to a point adjacent the gear 89 for the corresponding main drum 7 and is positioned to be engaged and actuated by a vertical pin 120 mounted on the outer portion of the gear. The other end of each lever is normally biased against one arm of a U-shaped stop bracket 121 by a tension spring 122 which is secured between the lever end and the end of the other and relatively long arm of the stop bracket.

The stop brackets 121 for the levers 117 of the inverted controlling units 50 and 52 are mounted, respectively, on the frame side wall 54 by the same bolts which secure the angle brackets 114 for springs 111 in position. The stop brackets for the upright units 49 and 51, on the other hand, are secured to the respective side walls by other bolts since these brackets are located on opposite portions of the side walls from the corresponding spring brackets 114.

As best shown in Fig. 5, the two locking crank arms 118 mounted on the overlapped ends of the locking shafts 115 for any two adjacent controlling units are arranged in a single vertical plane passing midway between the ends of the corresponding drive shafts 62. Thus either or both of the upper and lower locking arms 118 may be operative to block axial movement of the corresponding coupling disc 100 and insure maintenance of adjacent drive shafts in either coupled or uncoupled condition.

Under the invention, the described positions of the various stop brackets 121 and springs 122 are such that the associated locking crank arms 118 are normally horizontal, with the tapered ends thereof blocking coupling disc movement as shown in connection with the upper locking arm in Fig. 6. This locking condition is maintained at all times except when the actuating pins 120 on gears 89 engage the adjacent ends of locking levers 117 and effect pivot of the locking shafts 115, the opposite lever ends then being moved away from the stop brackets 121 therefor against the bias of springs 122.

Because of the described reverse drives for the switch drums of upright and inverted controlling units, the locking shafts 115 of adjacent controlling units are pivoted in opposite directions effecting pivotal spreading of the upper and lower locking crank arms 118 for each coupling disc 100. Thus, the lower locking arm 118 at the right end of the shaft 115 of unit 49 is illustrated in Fig. 6 as pivoted counterclockwise to unlocking position at which the disc 100 may be axially shifted past the tapered arm end. The upper locking arm 118 at the left end of the shaft for unit 50, on the other hand, is shown as in horizontal locking position since the pin 120 (Fig. 5) on the gear 89 of unit 50 is out of engagement with lever 117 thereof.

To effect locking of the lower lever 117, the gear 89 of unit 49 must be rotated counterclockwise until the associated pin 120 disengages its lever 49, the arm 117 then being pivoted clockwise under the bias of spring 122. The reverse is true of the upper lever in Fig. 6 since unlocking thereof, as distinguished from locking, is effected by counterclockwise movement of the pin 120 of unit 50 until the corresponding lever 117 is actuated.

The described construction, wherein each coupling disc 100 is normally locked by two locking lever arms 118 respectively operated by units on opposite sides of the disc, is highly important in the case of controllers incorporating a relatively large number of controlling units. In such controllers it is frequently necessary to provide drives operated by two drive motors 16 located one at each end of a row of units, so that a centrally located unit may either be idle or driven by one motor or the other in accordance with the requirements of the printing press system being controlled. In spite of this variation in driving sources, however, the coupling disc 100 between two adjacent operating and idle units is always controlled by one of the two locking arms 118 therefor.

Referring again to Fig. 5, the actuating pins 120 are mounted on the respective gears 89 at positions effecting unlocking of the associated discs 100 only when the controlling units are in predetermined corresponding positions, that is to say when the adjacent operating and non-operating units are each at a position which may be termed "mechanical zero." The controller 49, which is illustrated as in an uncoupled condition, is necessarily in this position since it could only have been uncoupled at mechanical zero. The remaining units 50—52, on the other hand, are not at mechanical zero since they are shown in operating condition with the pins 120 spaced from the ends of the corresponding levers 117.

To place the units 50—52 in mechanical zero, the coupled drive shafts 62 are driven by motor 16 in the "reverse" direction, that is to say the direction effecting commutation of the main and vernier resistors by drums 7 and 8 to increase the secondary resistance in the governed motors 1 and thus decrease the speed thereof. When the motor 16 is driving the controller in the reverse direction the gears 89 of units 50 and 52 rotate counterclockwise in Fig. 5, and the gear 89 of unit 51 rotates clockwise as does the gear of unit 49 when the same is coupled to the drive. These directions of rotation effect engagement between pins 120 and the associated levers 117 slightly before mechanical zero position is reached, so that all of the locking arms 118 are spread outwardly to unlocking positions at mechanical zero.

Assuming that all of the controlling units 49—52 are coupled at the mechanical zero position, they may be synchronously driven in a "forward" direction by the described drive to effect step-by-step commutation of the resistors for all the motors 1, so that the load bearing relationship in the motors is balanced at all speed points. In the following description of this operation only the upright units 49 and 51 will be considered, it being understood that the description is equally applicable, except for reversed directions of rotation, to the inverted units 50 and 52.

When the units 49 and 51 are in the mechanical zero position, the two-toothed gear sectors 86 on special gears 67 are in full engagement with idler gears 87, as illustrated in Fig. 5 in connection with unit 49. Upon operation of the controller in the "forward" direction, the gear elements 67 and 89 will immediately be rotated counterclockwise until the two-toothed sectors 86 disengage the idlers 87. Such disengagement of gears 87 is effected, because of the particular gear ratios selected, after thirty degree rotation of gears 67 and 89 and takes place during two "steps" or movements of two adjacent teeth 41 of indexing wheel 22 past roller 39 of position lock 23. The thirty degree counterclockwise rotation of gears 89 is sufficient to effect release of the locking levers 117 by pins 120 and consequent pivot of locking arms 118 to horizontal locking positions preventing axial shifting of coupling discs 100.

The gear elements 67 and 89 being mounted, respectively, on the vernier and main shafts 68 and 69, the vernier and main cams 74 and 75 are likewise shifted counterclockwise for thirty degrees during the described gear movements. As the controller drive is continued in the forward direction, counterclockwise rotation of the vernier shafts 68 and cams 74 is continued by special gears 67 meshing with gears 66 on drive shafts 62. The shafts 69 and cams 75 of the main switching drums 7, on the other hand, remain in the thirty degree position since the two-toothed sectors 86 are then out of engagement with idlers 87 and the idlers are locked by discs 92 as previously stated.

During approximately one counterclockwise revolution of the cams 74 of vernier drums 8, the associated switches 73 are operated to commutate the entire vernier resistance to effect step-by-step increases in the speeds of motors 1. Upon approximate completion of the counterclockwise revolution, the two-toothed sectors 86 again engage the idlers 87 and drive the main drum shafts 69 through gears 89, the idlers then being unlocked through registry of notches 93 in discs 92 therewith. The main drums are thus rotated counterclockwise for forty-five degrees and commutate a portion of their associated main resistance and further increase the speed of motors 1.

The vernier drums 8 are then rotated counterclockwise a second full revolution to again commutate their entire resistance and further increase the motor speed, after which the main drums 7 are actuated, as above described, to partially commutate their associated resistance. After approximately the fourth full revolution of the vernier drums 8, the motors 1 are operating at their highest speed and the two-toothed sectors 86 are in engagement with idlers 87. The drive motor 16 may then be run in the "reverse" direction to reverse the commutating operations until the mechanical zero position is again reached, the governed motors 1 thus being progressively run at lower and lower speeds.

Suitable limit switches, not shown, are associated with the electrical interlock drum 10 to de-energize the controller motor 16 both when the units are at mechanical zero position and when the units are at controlling positions effecting operation of motors 1 at their highest speed. These limit switches form part of the control circuit described in detail in the previously mentioned copending application. The interlock drum 10, which is driven through meshing spur gears 123 and 124 at the upper end of the vernier shaft 68 for folder controlling unit 51, is also identical to the one described in the cited copending application and need not be further discussed herein.

Figure 9:
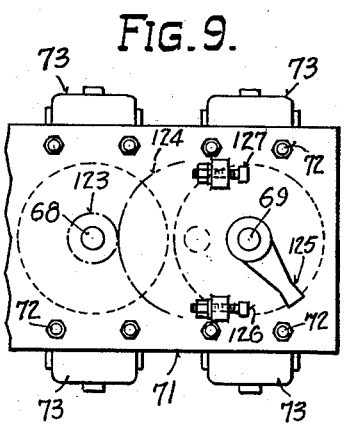
Fig. 9 is a detail partially diagrammatic plan view showing the stop arm for one of the units and taken on line 9—9 of Fig. 2.

To prevent improper operation of the controller in the event of breakdown of the above limit switches and consequent continued driving of the drums 7 and 8 after mechanical zero or top speed controlling positions are reached, mechanical stop means are mounted on the outer surface of the bearing plate 71 for each controlling unit. As best shown in Fig. 9, each stop means comprises a horizontal arm 125 rigidly mounted at the outer end of a main shaft 69, and a pair of bolts 126 and 127 threaded through suitable lugs on the bearing plate surface.

The stop bolt 126 for each unit is positioned to be engaged by the outer end of arm 125 when the unit is in mechanical zero position, and the bolt 127 is engaged when the unit is at the position effecting top motor speed. Since the two-toothed sector 86 is in locking engagement with idler 87 at both of these controlling positions, both main and vernier drums 7 and 8 are locked when a bolt 126 or 127 is engaged by arm 125 to prevent continued rotation of the shaft 69 of main drum 7. The resulting locking of the drives for the drum is not detrimental since it merely effects slipping of friction disc 21 relative to indexing wheel 22 in the slip clutch mechanism 18.

Under the described system wherein both main and vernier resistors and drums are employed, it is desirable that motor speed increases be effected by commutating the entire vernier resistance before the commutation of any main resistance upon operation of the controller forwardly from mechanical zero position. As previously stated, however, the main switch drums 7 are initially rotated for thirty degrees, as the controller is operated in a forward direction from mechanical zero, in order to effect immediate locking of coupling members 100 through disengagement of pins 120 from the locking levers 117. Accordingly, means are provided to de-energize the governed motors 1 during this thirty degree or two step interval, so that any commutating action by the drums 7 and 8 is inoperative to affect motor speed. The vernier and main cams 74 and 75 may therefore be designed for full utilization of all portions of the cam peripheries, without regard to the prevention of commutation during the thirty degree movement.

Referring to Fig. 12, the de-energizing means comprise a cam 128, a normally closed switch 129 operated thereby, and a normally open relay 130 having its coil connected in series with the switch 129 across a suitable source 131 of current. The contacts of relay 130 are connected to control the energization of the primaries of motors 1 by the power lines 3, so that the relay and associated elements in reality form part of the motor primary controls which are illustrated schematically at 132 and 133.

The cam 128 and switch 129 are incorporated in the electrical interlock drum 10, and are designed and adjusted in such a way that upon operation of the controller in the reverse or speed reducing direction, the cam effects opening of the switch 129 immediately before the main and vernier drums 7 and 8 reach the described two step point thirty degrees from the mechanical zero position. The resulting de-energization of motors 1, due to opening of the contacts of relay 130, is maintained during movement of the drums to mechanical zero and is continued until the switch 129 again closes upon operation of the controller in the forward direction.

The referred to thirty degree or two step position may be termed "electrical zero" and is, as indicated heretofore, the point at which the two-toothed sectors 86 disengage the idlers 87 upon operation of the controller in a forward direction from mechanical zero. Upon further forward operation of the controller for one step, that is to say rotation of the indexing wheel 22 to cause a single indexing wheel tooth 41 to pass roller 39, the motors 1 are energized through closing of relay 130 and operate at their lowest speed point which is normally twenty-five per cent of rated speed. Further forward operation results in step-by-step resistance commutation until top motor speed is attained, with the relay 130 remaining in closed condition during this entire operating sequence.

The operation of the controller will next be described. Assume that all of the controlling units 49—52 are in the mechanical zero position with the pins 120 on gears 89 in engagement with the locking levers 117, so that the locking crank arms 118 are pivoted outwardly to unlocking positions against the bias of springs 122. Further assume that the size and type of the newspaper to be printed requires only two press units and one folder unit. For example, the press drive motors 1 controlled by units 50 and 52 and the folder motor governed by unit 51 may be required for operation, whereas the press motor corresponding to controlling unit 49 may not be required.

Referring to Fig. 12, the press motor 1 controlled by unit 49 is therefore uncoupled from the common press shaft, represented schematically at 134, by disengaging a coupling 135 therein. In addition, the primary control 133 for the unit 49 drive motor is operated to insure continued de-energization of the motor, for example through use of the previously mentioned set-up switches operated by the lever member 105 for unit 49. Controlling unit 49 is also uncoupled from the drive shaft 62 of the adjacent unit 50 by throwing the handle 106 of the corresponding lever member 105 to the right. The coupling disc 100 for unit 49 is thus shifted to the left past the locking crank arms 118, so that the beveled end 104 of the pin 103 on disc 100 is withdrawn from the notch 99 in the coupling crank arm 98 on the unit 50 drive shaft.

Both the controlling unit 49 and the corresponding press motor 1 are thus uncoupled, and they remain stationary during the entire press run. The remaining couplings for the press and folder motors 1 are then engaged, as shown in Fig. 12, and the remaining couplings in the controller are also engaged by throwing the lever handles 106 to the left to insert pin ends 104 on discs 100 in coupling crank notches 99. The primary controls 132 and 133 are also operated to place the energization of the motors 1 governed by units 50—52 under the control of relay 130.

The "forward" button of the control circuit for the controller, which is described in the cited copending application, may then be pressed by the operator of the device to effect running of the controller motor 16 in the forward direction and also cause energization of position lock winding 37. The controller drive is thus started upon consequent withdrawal of roller 39 from a slot 40 in indexing wheel 22 to make the rotating friction disc 21 operative to drive the vertical and horizontal shafts 27 and 62.

Upon rotation of the coupled shafts 62 for units 50—52, the vernier shafts 68 thereof are rotated and, because of the engagement at this time of two-toothed sectors 86 with idlers 87, the main shafts 69 are also rotated. Due to the described reverse drive, the main and vernier shafts of adjacent units are synchronously driven in opposite directions, illustrated as clockwise in the case of units 50 and 52 and counterclockwise in the case of unit 51.

After this rotation of the shafts 68 and 69 for the vernier and main drums has continued for thirty degrees until the two-toothed sectors 86 disengage the idlers 87, that is to say to the electrical zero point, the pins 120 on gears 89 are disengaged from locking levers 117. Because of this disengagement, the springs 122 operate to pivot shafts 115 until the locking levers 117 engage the stop brackets 121 therefor, the associated locking crank arms 118 thus being pivoted to horizontal locking positions (Fig. 2) with their ends blocking axial shifting of coupling discs 100. The disc 100 between units 49 and 50 is thus blocked against coupling action by the upper arm 118 operated by unit 50, although the lower arm 118 associated with idle unit 49 remains in unlocking position as shown in Fig. 6. The discs 100 between unit 51 and the adjacent units 50 and 52 are likewise locked in coupled condition, each by two of the locking arms 118.

The above thirty degree rotation of the main and vernier switch drums takes place during two steps corresponding to movement of two indexing teeth 41 past the roller 40. During the third step, when the third tooth 41 is adjacent roller 40, the cam 128 on electrical interlock drum 10 operates to effect closing of switch 129 and thus close relay 130 to energize the motors 1 of units 50—52. Accordingly, as soon as the next slot 40 of indexing wheel 22 reaches the roller 39, the switches 73 on the main and vernier drums 7 and 8 are in positions which are operative to effect running of the motors 1 at their lowest speed. Any commutation of resistance occurring prior to closing of relay 130 is inoperative and harmless since the motors 1 are in a de-energized condition and are not operating.

Upon further forward operation of the controller, the various main and vernier drums 7 and 8 are synchronously shifted to corresponding controlling positions which progressively decrease the resistance in the rotors of motors 1 and effect operation thereof at higher and higher speed points. When the operator of the device desires to maintain the motors 1 at a certain speed point, he merely releases the "forward" button and causes, as previously described, the roller 39 to ride into the next adjacent slot 40 of indexing wheel 22 and remain in said slot. When the roller 39 is in a given slot 40, all of the switches 73 of drums 7 and 8 are either fully open or fully closed and the motors 1 are running at a given speed.

The operator may then run the motors at further increased speeds until top speed is attained, by again pressing the "forward" button. During the speed increases, the vernier drums 8 rotate continuously to commutate their associated resistance and the main drums rotate intermittently to commutate portions of their associated resistance once during approximately each full revolution of the vernier drums. At top speed, the described limit switches and mechanical stop means including arm 125 (Fig. 9) prevent further forward operation of the controller.

From top speed, or from any intermediate point, the operator may progressively decrease the motor speed by pressing a "reverse" button. The direction of rotation of controller motor 16 is thus reversed to change the direction of drum rotation, so that the entire commutation sequence is reversed until the electrical and mechanical zero points are again reached.

During the entire operating period of motors 1 the controlling units 49—52 cannot be coupled or uncoupled since the locking crank arms 118 block axial motion of coupling discs 100. It is therefore impossible for controlling unit 50, for example, to be uncoupled and lag behind the others with consequent unbalance of motor operation. It is only when the units have been driven in the reverse direction to mechanical zero, and after the motors 1 have been de-energized by cam 128 and relay 130 immediately before electrical zero is reached, that coupling and uncoupling can occur as a result of pivoting of arms 118 to unlocking positions as previously set forth.

To prepare the units 49—52 for a press run in which all four of the motors 1 are required for operation, the unit 49 is coupled at mechanical zero by throwing the coupling handle 106 to the left. This, however, can only be accomplished if the beveled end 104 of the pin 103 on the disc 100 for unit 49 is directly opposite the notch 99 at the end of the unit 50 coupling crank arm 98.

The invention provides a simple, compact and foolproof apparatus for controlling the motors of a multiple motor system. Because of the described frame construction, any number of substantially identical units may be incorporated in the controller in accordnace with the number of drive motors in the press system to be controlled.

Various embodiments of the invention may be employed within the scope of the following claims.

I claim:

1. A controller for a multiple motor drive, which comprises a plurality of controlling units adapted, respectively, for governing the operation of an associated one of the motors of said drive, said controlling units effecting when in corresponding controlling positions a predetermined operating relationship in the motors with which said controlling units may be associated, means to selectively operate certain of said controlling units while leaving in nonoperating condition others of said controlling units, and means to prevent at least unidirectional variation in the number of operating controlling units except when said controlling units are in positions at which said predetermined operating relationship in the motors to which said controlling units may be associated is maintained.

2. A controller for a number of corresponding electric motors, which comprises a plurality of controlling units each being adapted to be connected to govern the operation of an associated one of said motors, each of said controlling units having a substantial number of controlling positions corresponding, respectively, to the controlling positions of other controlling units and being adapted to effecting when said units are in corresponding positions a predetermined operating relation in the motors with which they may be associated, means adapted when said controlling units are in corresponding positions to synchronously shift the units to other corresponding positions, means to selectively render said shifting means inoperative to effect shifting of certain of said controlling units and operative to effect shifting of other of said units, and means to prevent operation of said last-named means at all times except when said units are in corresponding positions for insured maintenance in said predetermined operating relation of the motors with which said units may be associated.

3. A controller for similar electric motors having connections therebetween for maintenance of a predetermined speed relationship, comprising a plurality of similar controlling units adapted to be connected, respectively, to an associated one of said motors to govern the operation thereof, said units each having a substantial number of controlling positions corresponding to the controlling positions of other units and producing when said units are in corresponding positions predetermined speeds and a predetermined load bearing relationship in the motors with which said units are adapted to be connected, means operative when said units are in corresponding positions to synchronously drive the same to other corresponding positions for variation in the speeds of said motors, coupling means interposed, respectively, between said drive means and said controlling units and operative to selectively couple the units for operating motors and uncouple the units for nonoperating motors, and means to lock said coupling means at all times except when said controlling units are in corresponding positions, said locking means serving to prevent disturbance of said predetermined load bearing relationship of said motors through attempts to drive the motors at unrelated speeds.

4. A speed controller for a plurality of wound rotor induction motors, the rotors of said motors being coupled for maintenance of a predetermined speed relation, which comprises a plurality of resistor means for connection, respectively, in circuit with an associated one of said rotors, a like number of control means associated, respectively, with said resistor means to vary the amounts of resistance to be connected in circuit with said rotors, the control means and resistor means for association with each rotor corresponding to the control and resistor means for association with each of the other rotors to effect when said control means are in corresponding positions a predetermined load bearing relation in such motors, means adapted when said control means are in corresponding positions to drive the same to other corresponding positions, means to selectively render said drive means inoperative to drive the control means for association with nonoperating motors and operative to drive the control means for association with operating motors, and means to prevent operation of said last-named means except when said control means are in predetermined corresponding positions to thereby insure maintenance of such motors in said load bearing relation.

5. A speed controller for a plurality of similar wound rotor induction motors, the rotors of said motors being coupled for operation in a predetermined speed relation, which comprises a plurality of resistor networks for connection, respectively, in circuit with such rotors, a plurality of switching assemblies connected, respectively, to an associated one of said resistor networks and having a substantial number of switching positions for variation of the amount of resistance for connection in circuit with such rotors and thus of the speeds thereof, the resistor network and switching assembly for association with each rotor corresponding to the resistor network and switching assembly for association with each of the other rotors to effect when said switching assemblies are in corresponding positions a predetermined load bearing relation in such motors, motor operated means adapted when said switching assemblies are in corresponding positions to synchronously drive the same to other corresponding positions, a plurality of couplings interposed, respectively, between said motor operated means and said switching assemblies and operative to selectively couple and uncouple various switching assemblies in accordance with the motors required for operation, and locking means associated with said couplings to prevent operation thereof except when said switching assemblies are in corresponding positions and such motor load bearing relation is maintained.

6. The combination with a plurality of interconnected wound rotor induction motors, of apparatus for controlling operation of said motors comprising a plurality of resistor networks each connected in circuit with the rotor of one of said motors and consisting of a number of main resistors and a number of vernier resistors, a plurality of vernier switch drums connected, respectively, in circuit with said vernier resistors to commutate the same into and out of the circuit of the corresponding rotor, a like number of main switch drums connected, respectively, in circuit with said main resistors to commutate the same into and out of the corresponding rotor circuit, the vernier and main switch drums for each resistor network corresponding to the vernier and main drums for the other resistor networks and effecting when said drums are in corresponding positions a predetermined load bearing relation in said motors, motor means operative when said vernier switch drums are in corresponding positions to synchronously operate the same to other corresponding positions, said motor means including an intermittent drive portion adapted when said main switch drums are in corresponding positions to effect synchronous operation thereof to other corresponding positions intermittently relative to the movements of said vernier switch drums, a plurality of couplings interposed in said motor means for selective coupling and uncoupling of the respective main and vernier switch drums in accordance with the motors required for operation, and locking means to prevent operation of said couplings except when said main and vernier switch drums are respectively in predetermined corresponding positions and said load bearing relation in said motors is maintained.

7. In a controller for a multiple motor drive, a plurality of controlling units each adapted for governing the operation of one of the motors of said drive, said controlling units corresponding to each other and cooperating when at a given position to effect a predetermined operating relation in said motors when associated therewith, drive means to selectively operate certain of said controlling units while leaving in nonoperating condition others of said controlling units, locking means adapted when in locking position to prevent at least unidirectional variation in the number of controlling units in operation, and means operated by said drive means to effect unlocking of said locking means when said controlling units are in a predetermined position at which said operating relation in said motors is maintained when associated therewith.

8. In a controller for a multiple motor drive, a plurality of controlling units each adapted for governing the operation of one of the motors of said drive, said controlling units corresponding to each other and effecting when at a given position a predetermined operating relation in said motors when associated therewith, motor operated shifting means to correspondingly shift said units to various controlling positions, said means including a plurality of coupling elements associated, respectively, with said controlling units and adapted to be selectively coupled and uncoupled in accordance with the requirements of the drive, and means actuated by said shifting means to lock said coupling elements against operation except when said controlling units are in a position at which said predetermined operated relation is maintained.

9. A controller for corresponding electric motors, which comprises a plurality of controlling units each adapted for governing the operation of one of said motors, each of said controlling units having a substantial number of controlling positions corresponding, respectively, to the controlling positions of other controlling units for effecting when said units are in corresponding positions a predetermined operating relation in such motors, motor operated drive means adapted when said controlling units are in corresponding positions to drive the units to other corresponding positions, said drive means including a plurality of shafts associated, respectively, with said controlling units and a plurality of coupling elements mounted on said shafts for shifting into positions at which the controlling units for association with certain of said motors are driven and the units for association with the other of said motors are maintained idle, and mechanical means operated by said drive means to lock said coupling elements against shifting at all times except when the associated controlling units are in predetermined corresponding positions.

10. A controller for a plurality of electric motors, comprising a plurality of controlling units each adapted to be associated with certain of said motors to govern the operation thereof, said units including corresponding first controlling assemblies and corresponding second controlling assemblies, means to operate said first controlling assemblies and to operate said second controlling assemblies intermittently relative to the operation of said first controlling assemblies, said means being adapted when said first and second controlling assemblies are in positions at which a predetermined operating relationship in such motors when associated therewith is effected to shift the assemblies to other positions at which said predetermined relationship is maintained, means to selectively place certain of said controlling units in condition for operation by said operating means and to place others of said controlling units in nonoperating condition, and locking means to prevent at least unidirectional variation in the number of controlling units in operating condition except when said units are in predetermined positions at which said operating relationship in said motors is effected, said locking means being operably associated with at least one of said second controlling assemblies for locking and unlocking action during intermittent operation thereof.

11. A device for controlling the operation of interconnected wound rotor induction motors, comprising a plurality of resistor networks each for connection in circuit with the rotor of one of said motors and consisting of a number of main resistors and a number of vernier resistors, a plurality of vernier switch drums connected, respectively, in circuit with said vernier resistors for commutating the same into and out of the circuit of the corresponding rotor, a like number of main switch drums connected, respectively, in circuit with said main resistors for commutating the same into and out of the corresponding rotor circuit, the vernier and main switch drums for each resistor network corresponding to the vernier and main drums for the other resistor networks for effecting when said drums are in corresponding positions a predetermined load bearing relation in such motors, motor means operative when said vernier switch drums are in corresponding positions to synchronously operate the same to other corresponding positions, said motor means including an intermittent drive portion adapted when said main switch drums are in corresponding positions to effect synchronous operation thereof to other corresponding positions intermittently relative to the movements of said vernier switch drums, a plurality of couplings interposed in said motor means for selective coupling and uncoupling of the respective main and vernier switch drums in accordance with the motors required for operation, and locking means operatively associated with said intermittent drive portion and adapted to prevent operation of said couplings at all times except when said locking means is actuated to unlocked position upon movement of said intermittent drive portion, said locking means being positioned relative to said intermittent drive portion to effect unlocking of said couplings upon rotation of said main and vernier switch drums to predetermined corresponding positions.

12. In a controller for a multiple motor drive, a plurality of controlling units each adapted to govern the operation of a motor of said drive, a plurality of shafts mounted in general axial alignment and drivingly connected, respectively, to said controlling units, a motor connected to at least one of said shafts to rotate the same, a plurality of coupling members mounted at the ends of said shafts and movable relative thereto, a plurality of crank members mounted on said shafts operably adjacent said coupling members, means on said coupling and crank members to effect coupling of said shafts when said coupling members are in given positions and uncoupling of said shafts when said coupling members are in other positions, said last-named means being operative only when said shafts are in a predetermined radial alignment, and means operative when said shafts are in said radial alignment to selectively move said coupling members to coupled and uncoupled positions for operation of certain of said controlling units in accordance with the requirements of said drive.

13. In a controller for a multiple motor drive, a plurality of controlling units adapted, respectively, to control the operation of the motors of said drive, said units being similar to each other for effecting when in corresponding positions a predetermined operating relationship in said motors, drive means operative when said units are in corresponding positions to shift the same to other corresponding positions, a plurality of coupling members interposed in said drive means between the respective controlling units and selectively movable to coupled and uncoupled positions to effect shifting operation of certain of said controlling units while leaving other of said units in nonoperating condition, a plurality of shafts corresponding, respectively, to said controlling units and having locking elements mounted thereon adjacent said coupling members, means to bias said shafts to locking rotated positions at which said locking elements prevent coupling and uncoupling movement of said coupling members, and means operated by said drive means to rotate said shafts to unlocking rotated positions at which said locking elements are inoperative to prevent movement of said coupling members, said last-named means being disposed to effect unlocking of said coupling members only when said controlling units are at predetermined corresponding positions at which said operating relationship in said motors is maintained.

14. A controller for a plurality of electric motors, comprising a plurality of controlling units each for association with certain of said motors to govern the operation thereof, said units including corresponding first controlling assemblies and corresponding second controlling assemblies, a plurality of drive shafts connected, respectively, to said first controlling assemblies to operate the same, a controller motor operatively associated with at least one of said drive shafts, a plurality of coupling members mounted at the ends of said drive shafts and selectively manually movable relative thereto, a plurality of crank members mounted on said drive shafts adjacent said coupling members, means on said coupling and crank members to effect coupling of adjacent drive shafts when said coupling members are in one position and uncoupling of adjacent drive shafts when said coupling members are in the opposite position, intermittent drive gearing connecting said first controlling assemblies to said second controlling assemblies to effect intermittent operation thereof during operation of said first controlling assemblies by said drive shafts and said controller motor, a plurality of locking members operably associated with the respective coupling members and biased to locking positions preventing coupling and uncoupling movements of said coupling members, and actuating members operated by said intermittent drive gearing and adapted to actuate said locking members to unlocking positions at which said coupling members are free for movement, said actuating members being disposed to effect said unlocking action only when said controlling units are at predetermined corresponding positions for effecting a predetermined operating relationship in the controlled electric motors.

15. The combination with a plurality of interconnected alternating current induction motors, of a like plurality of corresponding controlling units adapted, respectively, to control the operation of said motors, said controlling units effecting when in corresponding controlling positions a predetermined operating relationship in said motors, means to selectively drive the controlling units for certain of said motors and to place in nonoperating condition the controlling units for other of said motors, means to render said motors inoperative when said controlling units are in predetermined positions, and means to prevent variation in the number of driven controlling units at all times except when said motors are rendered inoperative by said last-named means.

16. A controller for similar electric motors having couplings therebetween for maintenance of a predetermined speed relationship, comprising a plurality of similar controlling units for connection, respectively, to said motors to govern the operation thereof, said units each having a substantial number of controlling positions corresponding to the controlling positions of other units for producing when said units are in corresponding positions predetermined speeds in said motors and a predetermined load bearing relationship therebetween, means operative when said units are in corresponding positions to synchronously drive the same to other corresponding positions for variation in the speeds of said motors, coupling means interposed, respectively, between said drive means and said controlling units and operative to selectively couple the units for operating motors and uncouple the units for nonoperating motors, limit switch means operated by said drive means for de-energizing such electric motors during intervals when said controlling units are in predetermined corresponding positions, and means actuated by said drive means to lock said coupling means except when said controlling units are in predetermined corresponding positions at which said limit switch means is in motor de-energizing condition, said locking means serving to prevent disturbance of such predetermined load bearing relationship of said motors through coupling and uncoupling of controlling units positioned for motor energization.

17. A controller for corresponding electric motors, which comprises a plurality of controlling units adapted for varying the speed of such motors through a substantial number of operating speeds, said controlling units each having a substantial number of controlling positions corresponding, respectively, to the controlling positions of other controlling units for effecting when said units are in corresponding positions a predetermined operating relationship in such motors, means operable when said controlling units are in corresponding positions to shift the same to other corresponding positions for variation of the operating speeds of said motors, said shifting means including constant drive portions and intermittent drive portions, means to selectively render said shifting means inoperative to effect shifting of certain of said controlling units and operative to effect shifting of other of said controlling units, locking means actuated by said intermittent drive portions to prevent operation of said last-named means at all times except when said units are in first predetermined corresponding positions, and limit switch means for de-energization of such motors when said controlling units are in second predetermined corresponding positions and to continue such de-energization when said units are in said first predetermined corresponding positions, the actuation of said locking means taking place during the movements of said controlling units between said first and second predetermined corresponding positions when said controlling units are inoperative for governing such motors due to the motor de-energization condition of said limit switch means.

18. In a controller for a multiple motor drive, a plurality of controlling units adapted, respectively, for controlling the operation of the motors of said drive, said units being similar to each other for effecting when in corresponding positions a predetermined operating relationship in said motors, drive means operative when said units are in corresponding positions to shift the same to other corresponding positions, a plurality of coupling members interposed in said drive means between the respective controlling units and selectively movable between coupled and uncoupled positions to effect shifting operation of certain of said controlling units while leaving other of said units in nonoperating condition, a plurality of locking assemblies corresponding, respectively, to said controlling units and having a tendency to assume locking positions preventing coupling and uncoupling operation of said coupling members, actuating members operated by said drive means and associated with said locking assemblies to engage the same and effect unlocking thereof when said controlling units are at predetermined corresponding positions, and means for de-energizing said motors prior to actuation of said locking assemblies to unlocking positions by said actuating members, said de-energizing means serving to insure de-energization of such motors during said unlocking of said locking assemblies.

19. In a controller for a plurality of interconnected electric motors, a plurality of corresponding controller units for connection, respectively, to govern the operation of said motors, means adapted when said controller units are in corresponding positions at which a predetermined operating relationship in said motors is effected to drive said units to other corresponding positions at which said predetermined operating relationship is maintained, said drive means including a plurality of shafts drivingly connected to the respective controller units and a plurality of movable coupling assemblies constructed to permit coupling of the respective shafts only when the same are in predetermined relative rotational positions, and means actuated by said drive means to lock said coupling assemblies against operation except when said units are in predetermined corresponding positions and said shafts are approximately in said radial alignment.

20. A controller for a plurality of electric motors, comprising a plurality of controlling units each associated with certain of said motors to govern the operation thereof, said units including corresponding first controlling assemblies and corresponding second controlling assemblies, means to drive said first controlling assemblies and to drive said second controlling assemblies intermittently relative to the driving of said first controlling assemblies, said means operating when said controlling assemblies are in corresponding positions at which a predetermined operating relationship in said motors is effected to drive said assemblies to other corresponding positions at which said predetermined operating relationship is maintained, coupling means interposed in said drive means to permit selective placing of said controlling units in operating and nonoperating conditions, locking means associated with said coupling means and normally in a locking position preventing coupling and uncoupling operation thereof, means operatively associated with said second controlling asesmblies to effect unlocking operation of said locking means during movements of said second controlling assemblies to predetermined corresponding positions, and means to de-energize said motors during said movements of said second controlling assemblies to said predetermined positions and thereby render said controlling units ineffective to govern said motors as said unlocking operation is effected.

21. In a controller for a multiple motor drive, a horizontal row of frame members arranged axially adjacent each other and in alternately upright and inverted positions, each of said frame members comprising a body portion and a plurality of leg portions, said leg portions of each frame member projecting outwardly from adjacent opposite edges of one horizontal side of said body portion to the body portions of the adjacent frame members and overlapping the leg portions of the adjacent frame members, means on the ends of said leg portions to secure the same to the body portions of adjacent frame members, and a plurality of controlling assemblies mounted, respectively, on corresponding horizontal surfaces of said frame members and alternately extending outwardly upwardly and downwardly in accordance with the upright and inverted positions of the associated frame members, said arrangement providing a compact controller having easily accessible components which may be identical for economy of mass production.

22. In a controller for a multiple motor drive, a plurality of frame members mounted axially adjacent each other, a like number of switching assemblies mounted, respectively, on the outer surfaces of said frame members, the switching assemblies for alternate frame members extending outwardly therefrom in one direction and the switching assemblies for the remaining alternate frame members extending outwardly therefrom in the opposite direction, drive shaft means journalled in said frame members and extending longitudinally thereof, and means operated by said drive shaft means to actuate said switching assemblies to a plurality of controlling positions, said arrangement providing a compact controller the switching assemblies of which are easily accessible for wiring operations.

23. In a controller, a frame unit, a pair of laterally spaced parallel shafts journalled in one wall of said frame unit and extending outwardly therefrom, switch means connected, respectively, to the outer portions of said shafts for actuation in a substantial number of controlling positions as said shafts are rotated, motor means to continuously rotate one of said shafts, and intermittent type drive gearing connecting said one shaft to the other shaft to effect intermittent rotation thereof relative to the rotation of said one shaft by said motor means, said drive gearing being mounted internally of said frame unit and affording together with said shafts and switch means a compact controller the switch means of which are readily accessible for wiring operations.

24. In a controller for a multiple motor drive, a horizontal row of similar frame members arranged axially adjacent each other and in alternately upright and inverted positions, each of said frame members comprising a body portion and a plurality of leg portions, said leg portions of each frame member projecting outwardly from adjacent opposite edges of one horizontal side of said body portion to adjacent the body portions of the adjacent frame members and overlapping the leg portions of the adjacent frame members, means to secure said leg portions to the body portions of the adjacent frame members, a plurality of switch assemblies mounted, respectively, on the corresponding horizontal surfaces of said frame members and alternately extending outwardly upwardly and downwardly in accordance with the upright and inverted positions of the associated frame members, said switch assemblies each comprising first and second switch drums mounted laterally adjacent each other, drive shaft means journalled longitudinally in said body portions, and means arranged within said body portions and operated by said drive shaft means to rotate said first switch drums and to rotate said second switch drums intermittently relative to the rotation of said first switch drums, said arrangement providing a compact controller having easily accessible substantially identical components.

25. In a controller for a multiple motor drive, a purality of frame members mounted axially adjacent each other, a like number of switching assemblies mounted, respectively, on the outer surfaces of said frame members, the switching assemblies for alternate frame members extending outwardly therefrom in one direction and the switching assemblies for the remaining alternate frame members extending outwardly therefrom in the opposite direction, a plurality of generally axially aligned drive shafts journalled, respectively, in said frame members, a plurality of coupling members arranged at the ends of said drive shafts and operable to couple and uncouple the same, gear means mounted within said frame members and operated by the respective drive shafts to drive said switching assemblies to a plurality of corresponding controlling positions, manually operable means to actuate said coupling members to selectively couple and uncouple said drive shafts and thus start and stop the drive for the associated switching assemblies, and means operated by said gear means to lock said coupling members against coupling and uncoupling operation at all times except when said switching assemblies are in predetermined corresponding controlling positions.

26. A controller for a plurality of corresponding interconnected electric motors, comprising a horizontal row of frame members mounted in alternately upright and inverted positions and formed with generally rectangular body portions and with leg portions extending outwardly from said body portions, a plurality of switch assemblies mounted, respectively, on corresponding horizontal surfaces of said frame members and alternately extending outwardly upwardly and downwardly in accordance with the upright and inverted positions of the associated frame members, said switch assemblies each including first and second switch drums mounted laterally adjacent each other, a plurality of generally axially aligned drive shafts each journalled in the body portion of one of said frame members and terminating outwardly thereof, a plurality of movable coupling members arranged at the ends of said drive shafts to couple and uncouple the same, gear means mounted within the body portions of said frame members and operated by the respective drive shafts to operate said first switch drums to a substantial number of controlling positions, intermittent drive gearing operated by the respective drive shafts to operate said second switch drums intermittently relative to the operation of said first switch drums, means mounted on the leg portions of said frame members and operable to actuate said coupling members to selectively couple and uncouple said drive shafts and thus start and stop the drives for the associated switch assemblies, a plurality of locking shafts each journalled in the body portion of one of said frame members and terminating adjacent said coupling members, a plurality of locking members mounted at each end of each locking shaft for locking and unlocking of said coupling members, means to bias said locking shafts and members to a locking position preventing operation of said coupling members, and means mounted on said intermittent drive gearing and disposed to rotate said locking shafts against the bias thereon and effect unlocking operation of said locking members when said switch assemblies are in predetermined corresponding positions effecting a predetermined operating relationship in said motors.

27. In a controller for a multiple motor drive, a plurality of frame members mounted axially adjacent each other, a like number of drum type switching assemblies mounted, respectively, on the outer surfaces of said frame members, the switching assemblies for alternate frame members extending outwardly therefrom in one direction and the switching assemblies for the remaining alternate frame members extending outwardly therefrom in the opposite direction, a plurality of axially aligned drive shafts journalled one in each of said frame members, a plurality of coupling members mounted at the ends of said drive shafts and movable to couple and uncouple the same, first gear means directly connected, respectively, to said switching assemblies to operate the same, second gear means mounted on said drive shafts and meshing with said first gear means, said second gear means being adapted upon rotation of said drive shafts in the same direction to rotate the first gear means for one set of alternate switching assemblies in one direction and the first gear means for the other set of alternate switching assemblies in the reverse direction, a plurality of locking shafts journalled one in each of said frame members and generally coextensive with the corresponding drive shafts, each of said locking shafts having two locking members provided one at each end thereof and tending to assume locking positions preventing coupling and uncoupling operation of the corresponding coupling members, and a plurality of actuating members mounted, respectively, on said first gear means and operatively associated with said locking shafts, said actuating members being adapted when said drive shafts are rotated in the same direction to angular positions effecting predetermined corresponding positions in said switching assemblies to rotate alternate locking shafts in opposite directions and thus cause movement of both locking members for each of said coupling members to unlocking positions.

28. For a multiple motor drive, a controller of the type having a plurality of controlling units each adapted to govern the operation of a motor of said drive, comprising in combination, a plurality of shafts mounted in general axial alignment for driving connection respectively to said controlling units, a motor connected to at least one of said shafts to rotate the same, a plurality of coupling member mounted at the ends of said shafts and movable relative thereto, a plurality of crank members mounted on said shafts operably adjacent said coupling members, means on said coupling and crank members to effect coupling of said shafts when said coupling members are in given positions and uncoupling of said shafts when said coupling members are in other positions, said last named means being operative only when said shafts are in a predetermined radial alignment, and means operative when said shafts are in said radial alignment to selectively move said coupling members to coupled and uncoupled positions for operation of certain of said controlling units in accordance with the requirements of said drive.

29. In a controller for a multiple motor drive, a plurality of like frame members each adapted for mounting a drum type switching assembly on an outer surface thereof, said frame members being mounted in alternate inverted relation axially adjacent each other, drive shaft means journaled in said frame members and extending longitudinally thereof, and means operated by said drive shaft for actuating said switching assemblies to a plurality of controlling positions.

30. In a controller for a multiple motor drive, a plurality of like frame members each adapted for mounting a drum type switching assembly on an outer surface thereof, said frame members being mounted in alternate inverted relation axially adjacent each other, a plurality of axially aligned drive shafts journaled one in each of said frame members, a plurality of coupling members mounted at the ends of said drive shafts and movable to couple and uncouple the same, first gear means for each frame member for direct connection, respectively, to said switching assemblies to operate the same, second gear means for each frame member mounted on said drive shafts and meshing with said first gear means, said second gear means being adapted upon rotation of said drive shafts in the same direction to rotate the first gear means for alternate inverted frame members in opposite directions, a plurality of locking shafts journaled one in each of said frame members and generally coextensive with the corresponding drive shafts, each of said locking shafts having two locking member provided one at each end thereof and tending to assume locking positions preventing coupling and uncoupling operation of the corresponding coupling members, and a plurality of actuating members mounted, respectively, on said first gear means and operatively associated with said locking shafts, said actuating members being adapted when said drive shafts are rotated in the same direction to angular positions for effecting predetermined corresponding positions in said switching assemblies to rotate alternate locking shafts in opposite directions and thus cause movement of both locking members for each of said coupling members to unlocking positions.

31. For a unit type printing press drive, in combination, polyphase alternating current motors for different units of the press, said motors having their shafts in axial alignment, means for coupling and uncoupling said shafts and control means for said motors for effecting operation thereof separately or together in selected numbers, said control means including speed regulating resistors for the secondary circuits of said motors individualized thereto and thus obviating need of effecting precision in positioning rotarily the secondaries of said motors in coupling the latter for operation together.

32. For a unit type drive having a selective number of mechanically coupled polyphase motors, a control for coordinated operation of said motors without predetermined relative rotational positioning therebetween, comprising a plurality of motor control means including load regulating resistors individualized for connection with the respective secondaries of said motors and means connectible for operation of a selected number of said control means in unison including means to prevent such connection for operation of a greater number of said control means except at a predetermined operating condition of the control means to be connected.

33. The combination of claim 32 in which said motor control means comprises interconnected main and vernier commutating means for said resistors.

THEODORE B. JOCHEM.

References Cited in the file of this patent

UNITED STATES PATENTS

| Number | Name | Date |
|---|---|---|
| 1,229,446 | Hall et al. | June 12, 1947 |
| 2,541,229 | Shannon | Feb. 13, 1951 |